US008320933B2

(12) United States Patent
Bhattacharya et al.

(10) Patent No.: US 8,320,933 B2
(45) Date of Patent: Nov. 27, 2012

(54) ESTIMATING WHETHER OR NOT A WIRELESS TERMINAL IS IN A ZONE USING RADIO NAVIGATION

(75) Inventors: Tarun Kumar Bhattacharya, San Jose, CA (US); Martin Feuerstein, Redmond, WA (US); Scot Douglas Gordon, Bothell, WA (US)

(73) Assignee: Polaris Wireless, Inc., Santa Clara, CA (US)

( * ) Notice: Subject to any disclaimer, the term of this patent is extended or adjusted under 35 U.S.C. 154(b) by 533 days.

(21) Appl. No.: 11/680,496

(22) Filed: Feb. 28, 2007

(65) Prior Publication Data

US 2008/0207219 A1 Aug. 28, 2008

(51) Int. Cl.
*H04W 24/00* (2009.01)
(52) U.S. Cl. ............ 455/456.1; 455/432; 455/440; 455/513; 455/456; 455/456.2; 370/332; 370/436; 370/331; 370/333.4
(58) Field of Classification Search .............. 370/332, 370/436, 331, 333.4; 455/432, 440, 456, 455/513, 456.2
See application file for complete search history.

(56) References Cited

U.S. PATENT DOCUMENTS

| 6,362,783 B1 | 3/2002 | Sugiura et al. |
| 6,522,888 B1 | 2/2003 | Garceran et al. |
| 6,556,819 B2 | 4/2003 | Irvin |
| 6,980,804 B2 * | 12/2005 | Maki et al. ............ 455/439 |
| 7,043,254 B2 | 5/2006 | Chawla et al. |
| 7,218,938 B1 * | 5/2007 | Lau et al. ............ 455/456.1 |
| 7,532,906 B2 | 5/2009 | Enenkiel |
| 2001/0022558 A1 * | 9/2001 | Karr et al. ............ 342/450 |
| 2002/0042269 A1 * | 4/2002 | Cotanis ............ 455/423 |
| 2003/0129992 A1 * | 7/2003 | Koorapaty et al. ....... 455/456 |
| 2003/0153331 A1 | 8/2003 | Alger |
| 2004/0243298 A1 * | 12/2004 | Knuuttila et al. ......... 701/117 |
| 2005/0048987 A1 | 3/2005 | Glass |
| 2005/0272443 A1 | 12/2005 | Hose et al. |
| 2006/0172731 A1 | 8/2006 | Tobe et al. |
| 2006/0281472 A1 * | 12/2006 | Walter ............ 455/456.2 |
| 2007/0004454 A1 | 1/2007 | Schweiger et al. |
| 2008/0076382 A1 | 3/2008 | Girard et al. |
| 2008/0084858 A1 | 4/2008 | Hart et al. |

OTHER PUBLICATIONS

"U.S. Appl. No. 11/844,175 Office Action Jul. 13, 2011",, Publisher: USPTO, Published in: US.
"U.S. Appl. No. 11/844,175 Panel Decision Apr. 15, 2011",, Publisher: USPTO, Published in: US.
"U.S. Appl. No. 11/844,175 Office Action Jan. 23, 2012",, Publisher: USPTO, Published in: US.

(Continued)

*Primary Examiner* — Olumide T Ajibade Akonai
*Assistant Examiner* — Edward Zhang
(74) *Attorney, Agent, or Firm* — Kaplan Breyer Schwarz & Ottesen, LLP

(57) ABSTRACT

A method for estimating whether or not a wireless terminal is in a zone is described. The method is based on the following observation: when a wireless terminal is at a particular location, the values of the traits of the ambient electromagnetic signals that vary with location represent a "fingerprint" or "signature" for that location. This enables the location of a wireless terminal to be estimated by comparing the observed values of the traits of the ambient electromagnetic signals with the fingerprint for each potential location for the wireless terminal.

24 Claims, 28 Drawing Sheets

OTHER PUBLICATIONS

Vasudevan, Nalini, "Node Localization in Wireless Ad-Hoc Sensor Networks", "Department of Computer Science" Feb.-Jun. 2005, pp. 9, 59, Publisher: RV College of Engineering Bangalore—59 India, Published in: IN.

"U.S. Appl. No. 11/844,175 Office Action Jun. 23, 2010", , Publisher: USPTO, Published in: US.

"U.S. Appl. No. 11/844,175 Office Action Nov. 22, 2010", , Publisher: USPTO, Published in: US.

* cited by examiner

ESTIMATING WHETHER OR NOT A WIRELESS TERMINAL IS IN A ZONE USING RADIO NAVIGATION

FIELD OF THE INVENTION

The present invention relates to radio navigation in general, and, more particularly, to methods and systems for determining when a wireless terminal is within a zone or more.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1, 102-2, and 102-3, wireless switching center 111, assistance server 112, location client 113, and Global Positioning System ("GPS") constellation 121. Wireless telecommunications system 100 provides wireless telecommunications service to all of geographic region 120, in well-known fashion.

The salient advantage of wireless telecommunications over wireline telecommunications is the mobility that is afforded to the users. On the other hand, the salient disadvantage of wireless telecommunications lies in that fact that because the user is mobile, an interested party might not be able to readily ascertain the location of the user.

In some cases, the owner/operator of wireless telecommunications system 100 might desire to charge its customers different rates depending on where they are at the time that they are using its service. For example, to better compete with land-based wireline telephone service, the owner/operator might desire to charge its customer a lower rate when they are at home and a higher rate when they are out shopping. In this case, the owner/operator might define the customer's home as a "zone" and charge less for calls made from that zone. The efficacy of this idea requires, however, a technique for estimating when a wireless terminal is in a zone and when it is not.

SUMMARY OF THE INVENTION

The present invention provides a technique for estimating whether or not a wireless terminal is in a zone without some of the costs and disadvantages for doing so in the prior art. The illustrative embodiment is based on the following observation: when a wireless terminal is at a particular location, the values of the traits of the ambient electromagnetic signals that vary with location represent a "fingerprint" or "signature" for that location. This enables the location of a wireless terminal to be estimated by comparing the observed values of the traits of the ambient electromagnetic signals with the fingerprint for each potential location for the wireless terminal. For example, suppose that the traits have a first set of values when the wireless terminal is at a first location, and a second set of values when the wireless terminal is at a second location. Then when the wireless terminal is at an unknown location and the traits at that unknown location more closely match the first set of values than the second set, it is more likely that the wireless terminal is at the first location than the second location.

To enable the wireless terminal to make this comparison, a zone is defined as a plurality of locations. Next, a computer-executable program is generated based on the expected values of the traits of the signals that should be observable in the zone. The computer-executable program is then transmitted to the wireless terminal, where it is installed and executed on a subscribed identity module on the wireless terminal.

The computer-executable program then continually measures the values of the traits of the signals in its purview and compares them to the values that would suggest that the wireless terminal is in the zone or not. When there is a good match, the computer-executable program estimates that the wireless terminal is in the zone and when there is not a good match, the computer-executable program estimates that the wireless terminal is not in the zone.

The illustrative embodiment comprises: generating a computer-executable program based on a database that comprises: (i) an expected value of a electromagnetic trait of a first signal in the first location, and (ii) an expected value of the electromagnetic trait of a second signal in a second location; and transmitting the computer-executable program to the wireless terminal for execution on the wireless terminal; wherein the computer-executable program estimates whether or not the wireless terminal is present in a zone is based on a measured value of the electromagnetic trait of the first signal; and wherein the zone comprises the first location and the second location.

DETAILED DESCRIPTION

Figure 1:
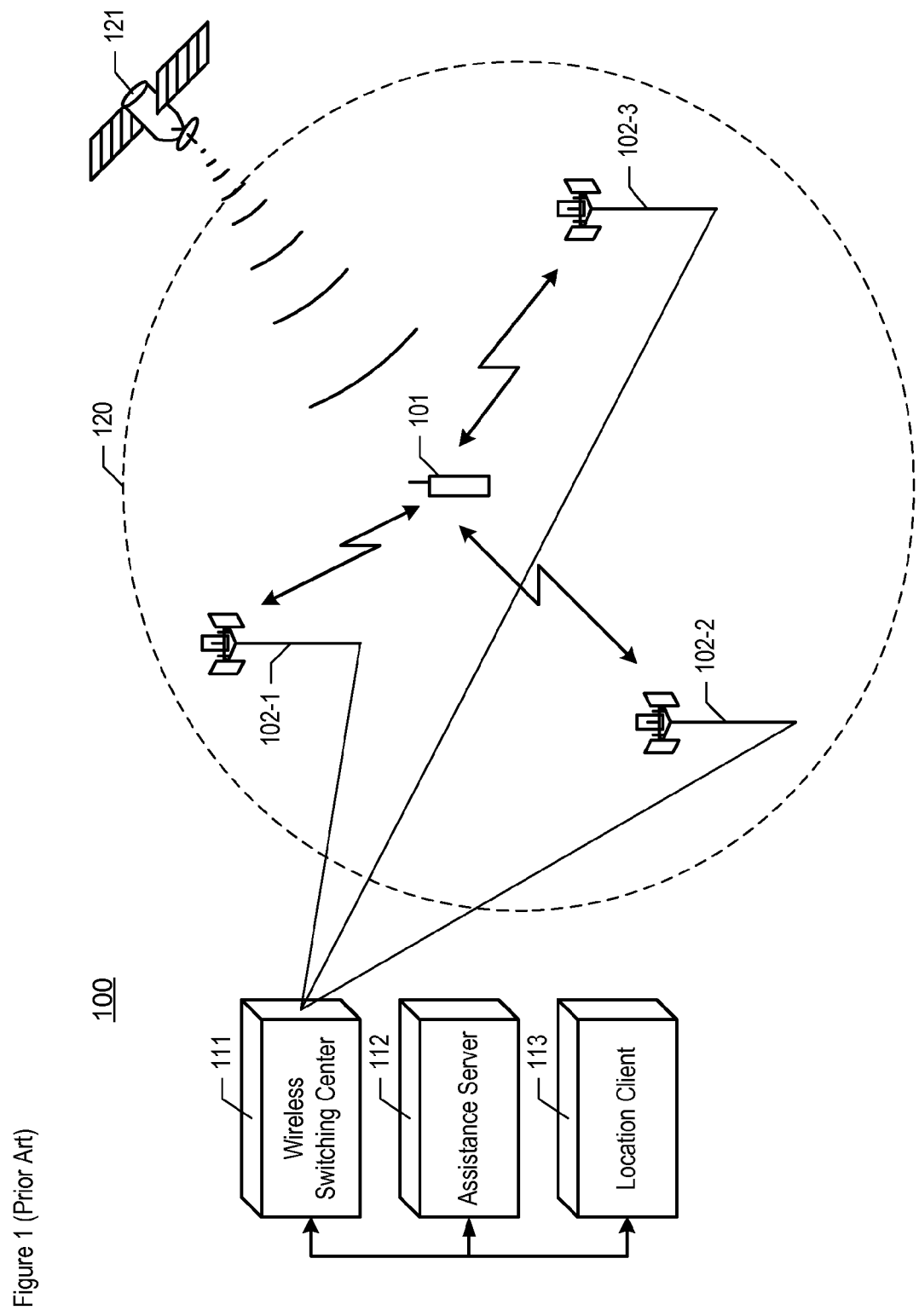
FIG. 1 depicts a diagram of the salient components of wireless telecommunications system 100 in accordance with the prior art.
Figure 2:
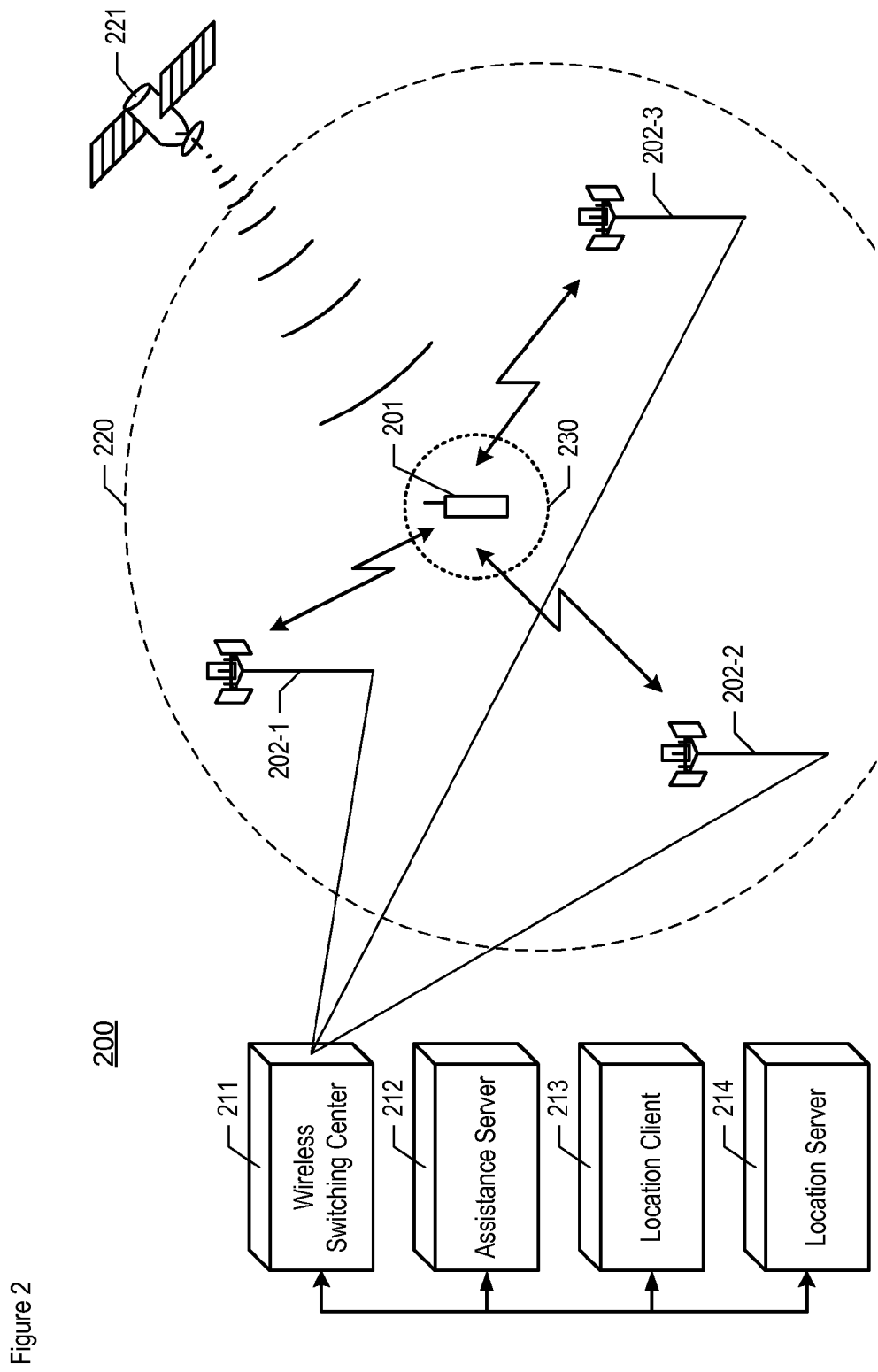
FIG. 2 depicts a schematic diagram of the salient components of wireless telecommunications system 200 in accordance with the illustrative embodiment of the present invention.

FIG. 2 depicts a schematic diagram of the salient components of wireless telecommunications system 200 in accordance with the illustrative embodiment of the present invention. Wireless telecommunications system 200 comprises: wireless terminal 201, base stations 202-1, 202-2, and 202-3, wireless switching center 211, assistance server 212, location client 213, location server 214, and GPS constellation 221, which are interrelated as shown. The illustrative embodiment provides wireless telecommunications service to all of geographic region 220, in well-known fashion, estimates whether or not wireless terminal 201 is in zone 230, and uses that estimate in a zone-based application.

In accordance with the illustrative embodiment, wireless telecommunications service is provided to wireless terminal 201 in accordance with the Universal Mobile Telecommunications System, which is commonly known as "UMTS." After reading this disclosure, however, it will be clear to those skilled in the art how to make and use alternative embodiments of the present invention that operate in accordance with one or more other air-interface standards (e.g., Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be UMTS-compliant and to perform the tasks described below and in the accompanying figures. For example and without limitation, wireless terminal 201 is capable of:
  i. measuring one or more traits of one of more electromagnetic signals, and
  ii. reporting those measurements to location server 214, and
  iii. transmitting one or more signals and of reporting the transmission parameters of those signals to location server 214, and
  iv. receiving GPS assistance data from assistance server 212 to assist it in acquiring and tasking GPS ranging signals, and
  v. estimating whether or not it is in zone 230.

Wireless terminal 201 is mobile and can be at any location within geographic region 220. Although wireless telecommunications system 200 comprises only one wireless terminal, it will be clear to those skilled in the art, after reading this disclosure, how to make and use alternative embodiments of the present invention that comprise any number of wireless terminals. The details of wireless terminal 201 are described below and in the accompanying figures.

Base stations 202-1, 202-2, and 202-3 communicate with wireless switching center 211 and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless switching center 211 comprises a switch that orchestrates the provisioning of telecommunications service to wireless terminal 201 and the flow of information to and from location server 214, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Assistance server 212 comprises hardware and software that is capable of performing the tasks described below and in the accompanying figures. In general, assistance server 212 generates GPS assistance data for wireless terminal 201 to aid wireless terminal 201 in acquiring and tasking GPS ranging signals from GPS constellation 221. In accordance with the illustrative embodiment, assistance server 212 is a separate physical entity from location server 214; however, it will be clear to those skilled in the art, after reading this disclosure, how to make and use alternative embodiments of the present invention in which assistance server 212 and location server 214 share hardware, software, or both.

Location client 213 comprises hardware and software that use the estimate of the location of wireless terminal 201—provided by location server 214—in a zone-based application, as described below and in the accompanying figures.

Location server 214 comprises hardware and software that assists in estimating whether or not wireless terminal 201 is in zone 230 as described below and in the accompanying figures. It will be clear to those skilled in the art, after reading this disclosure, how to make and use location server 214. Furthermore, although location server 214 is depicted in FIG. 2 as physically distinct from wireless switching center 211, it will be clear to those skilled in the art, after reading this disclosure, how to make and use alternative embodiments of the present invention in which location server 214 is wholly or partially integrated with wireless switching center 211.

In accordance with the illustrative embodiment, location server 214 communicates with wireless switching center 211, assistance server 212, and location client 213 via a local area network; however it will be clear to those skilled in the art, after reading this disclosure, how to make and use alternative embodiments of the present invention in which location server 214 communicates with one or more of these entities via a different network such as, for example, the Internet, the Public Switched Telephone Network (PSTN), etc.

In accordance with the illustrative embodiment, wireless switching center 211, assistance server 212, location client 213, and location server 214 are outside of geographic region 220. It will be clear to those skilled in the art, after reading this disclosure, how to make and use alternative embodiments of the present invention in which some or all of wireless switching center 211, assistance server 212, location client 213, and location server 214 are instead within geographic region 220.

Figure 3C:
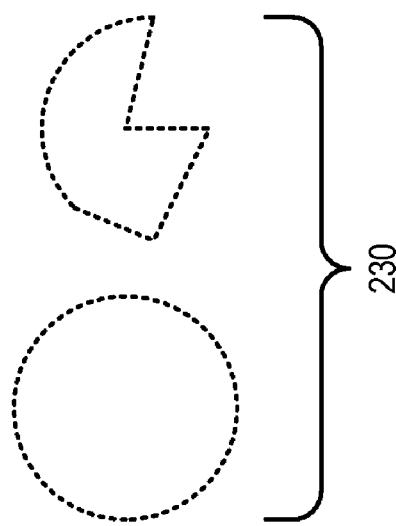
FIGS. 3a through 3c each depict a graphical representation of the scope of a zone in accordance with alternative embodiments of the present invention.
Figure 3B:
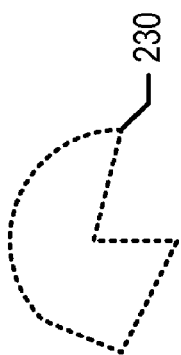
Figure 3A:
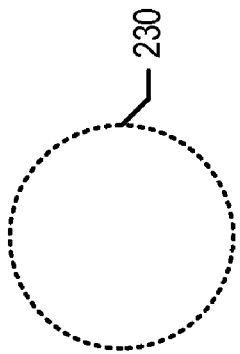

Zone 230 comprises one or more "locations" within geographic region 220, as depicted in FIG. 3a. In accordance with the illustrative embodiment, the scope of zone 230 comprises a circle. It will be clear to those skilled in the art, however, after reading this disclosure, how to make and use alternative embodiments of the present invention in which zone 230 has any shape—as, for example, depicted in FIG. 3b. In accordance with the illustrative embodiment, the scope of zone 230 comprises contiguous locations. It will be clear to those skilled in the art, however, after reading this disclosure, how to make and use alternative embodiments of the present invention in which zone 230 comprises a plurality non-contiguous locations, as, for example, depicted in FIG. 3c. In accordance with the illustrative embodiment, the scope and location of zone 230 are static. It will be clear to those skilled in the art, after reading this specification, how to make and use alternative embodiments of the present invention in which the scope of zone 230 is dynamic in scope or location or both scope or location.

Figure 4:
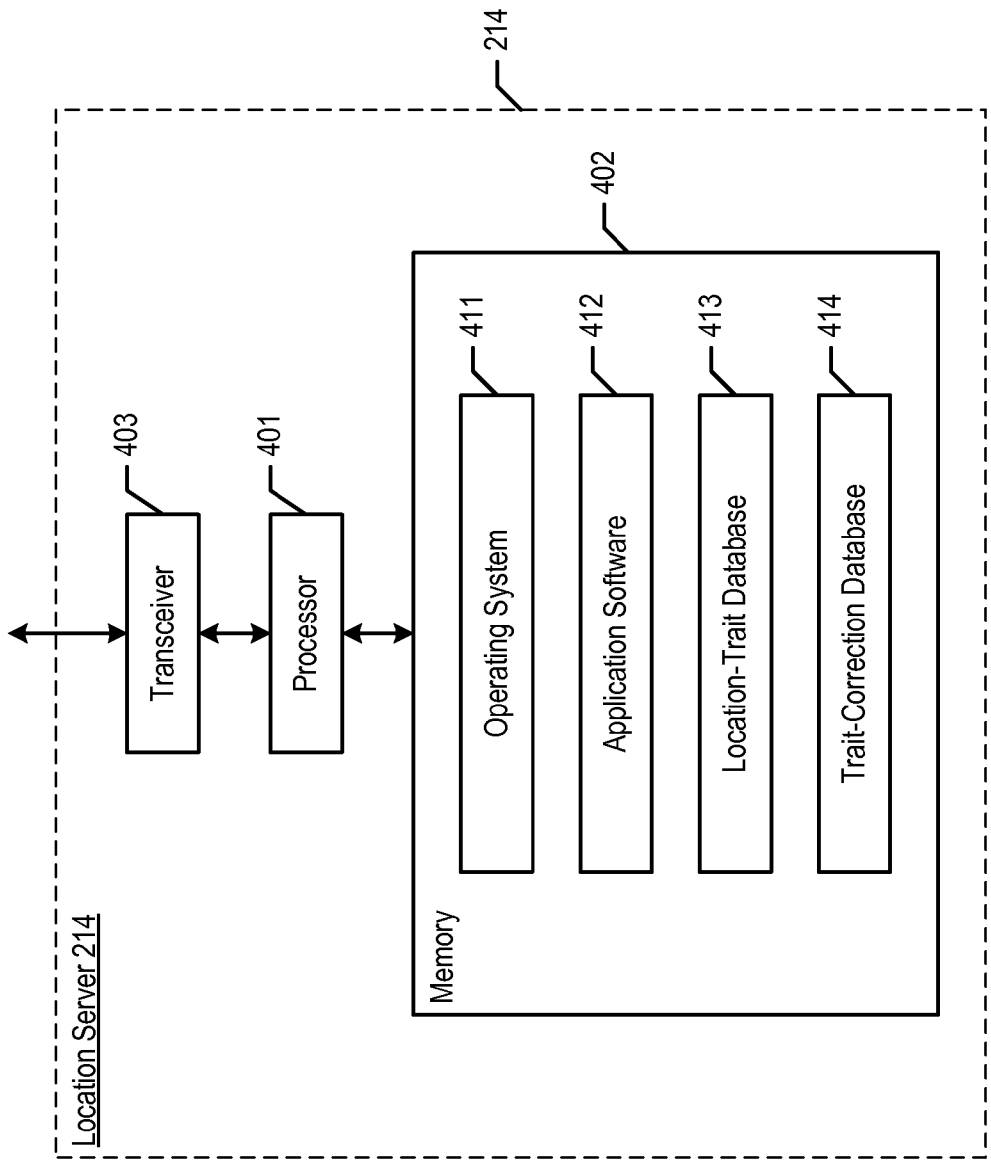
FIG. 4 depicts a block diagram of the salient components of location server 214 in accordance with the illustrative embodiment.

Location Server 214—FIG. 4 depicts a block diagram of the salient components of location server 214 in accordance with the illustrative embodiment. Location server 214 comprises: processor 401, memory 402, and local-area network transceiver 403, which are interconnected as shown.

Processor 401 is a general-purpose processor that is capable of executing operating system 411 and application software 412, and of populating, amending, using, and managing Location-Trait Database 413 and Trait-Correction Database 414, as described in detail below and in the accompanying figures. It will be clear to those skilled in the art how to make and use processor 401.

Memory 402 is a non-volatile memory that stores:
  i. operating system 411, and
  ii. application software 412, and
  iii. Location-Trait Database 413, and
  iv. Trait-Correction Database 414.
It will be clear to those skilled in the art how to make and use memory 402.

Transceiver 403 enables location server 214 to transmit and receive information to and from wireless switching center 211, assistance server 212, and location client 213. In addition, transceiver 403 enables location server 214 to transmit information to and receive information from wireless terminal 201 and base stations 202-1 through 202-3 via wireless switching center 211. It will be clear to those skilled in the art how to make and use transceiver 403.

Figure 5:
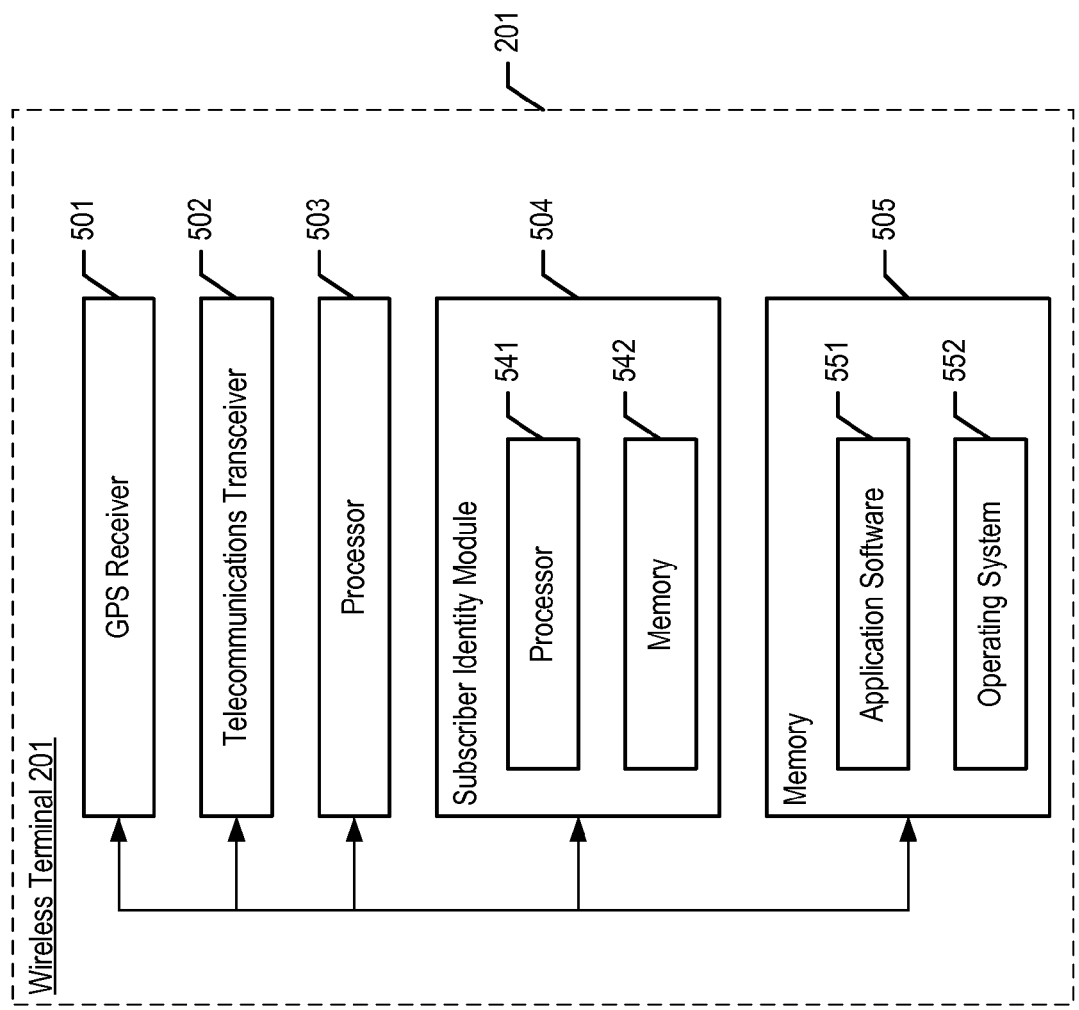
FIG. 5 depicts a block diagram of the salient components of wireless terminal 201 in accordance with the illustrative embodiment.

Wireless Terminal 201—FIG. 5 depicts a block diagram of the salient components of wireless terminal 201 in accordance with the illustrative embodiment. Wireless terminal 201 comprises: GPS receiver 501, telecommunications transceiver 502, processor 503, subscriber identity module 504, and memory 505, interconnected as shown.

GPS receiver 501 is hardware and software that is capable of receiving GPS assistance data from assistance server 212, in well-known fashion, and of using the GPS assistance data to receive and decode GPS ranging signals in well-known fashion, for the purposes of generating an estimate of the location of wireless terminal 201. It will be clear to those skilled in the art how to make and use GPS receiver 501.

Telecommunications transceiver 502 is hardware and software that is capable of enabling wireless terminal 201 to communicate with base stations 202-1, 202-2, and 202-3 via radio. It will be clear to those skilled in the art how to make and use telecommunications transceiver 502.

Processor 503 is hardware that is a capable of executing application software 551 and operating system 552 in memory 505 in well-known fashion. It will be clear to those skilled in the art how to make and use processor 503.

Subscriber identity module 504 is hardware and software that provides the unique identity to wireless terminal 201. Subscriber identity module 504 comprises processor 541 and memory 542. Processor 541 is hardware that is capable of executing application software in memory 542 in well-known fashion, and memory 542 is a non-volatile memory. It will be clear to those skilled in the art how to make and use subscriber identity module 504.

Memory 505 is a non-volatile memory that stores application software 551 and operating system 552 in well-known fashion. It will be clear to those skilled in the art art how to make and use memory 505.

Figure 6:
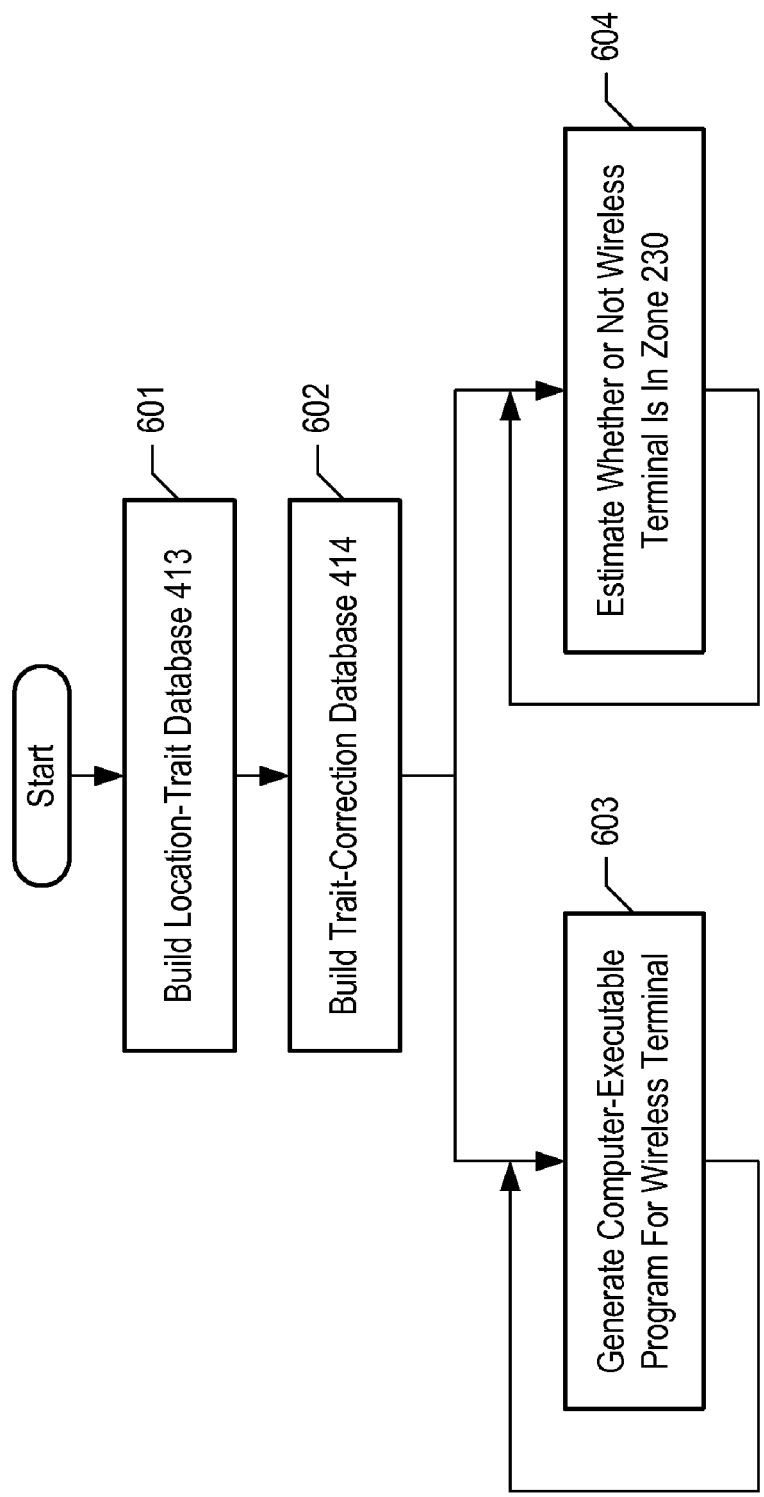
FIG. 6 depicts a flowchart of the salient tasks performed in accordance with the illustrative embodiment of the present invention.

Operation of the Illustrative Embodiment—FIG. 6 depicts a flowchart of the salient tasks performed in accordance with the illustrative embodiment of the present invention.

In accordance with task 601, Location-Trait Database 413 is built. For the purposes of this specification, the "Location-Trait Database" is defined as a database that maps each of a plurality of locations to one or more expected traits associated with a wireless terminal at that location. The details of task 601 are described below and in the accompanying figures.

In accordance with task 602, Trait-Correction Database 414 is built. For the purposes of this specification, the "Trait-Correction Database" is defined as a database that indicates how the measurement of traits can be adjusted to compensate for systemic measurement errors. The details of task 602 are described below and in the accompanying figures.

In accordance with task 603, location server 214 generates a computer-executable program for wireless terminal 201 that estimates whether or not wireless terminal 201 is in zone 230 based on one or more measured values of electromagnetic traits of one or more signals. Task 603 is described in detail below and in the accompanying figures.

In accordance with task 604, wireless terminal 201 estimates whether or not wireless terminal 201 is in zone 230. The details of task 604 are described below and in the accompanying figures.

Figure 7:
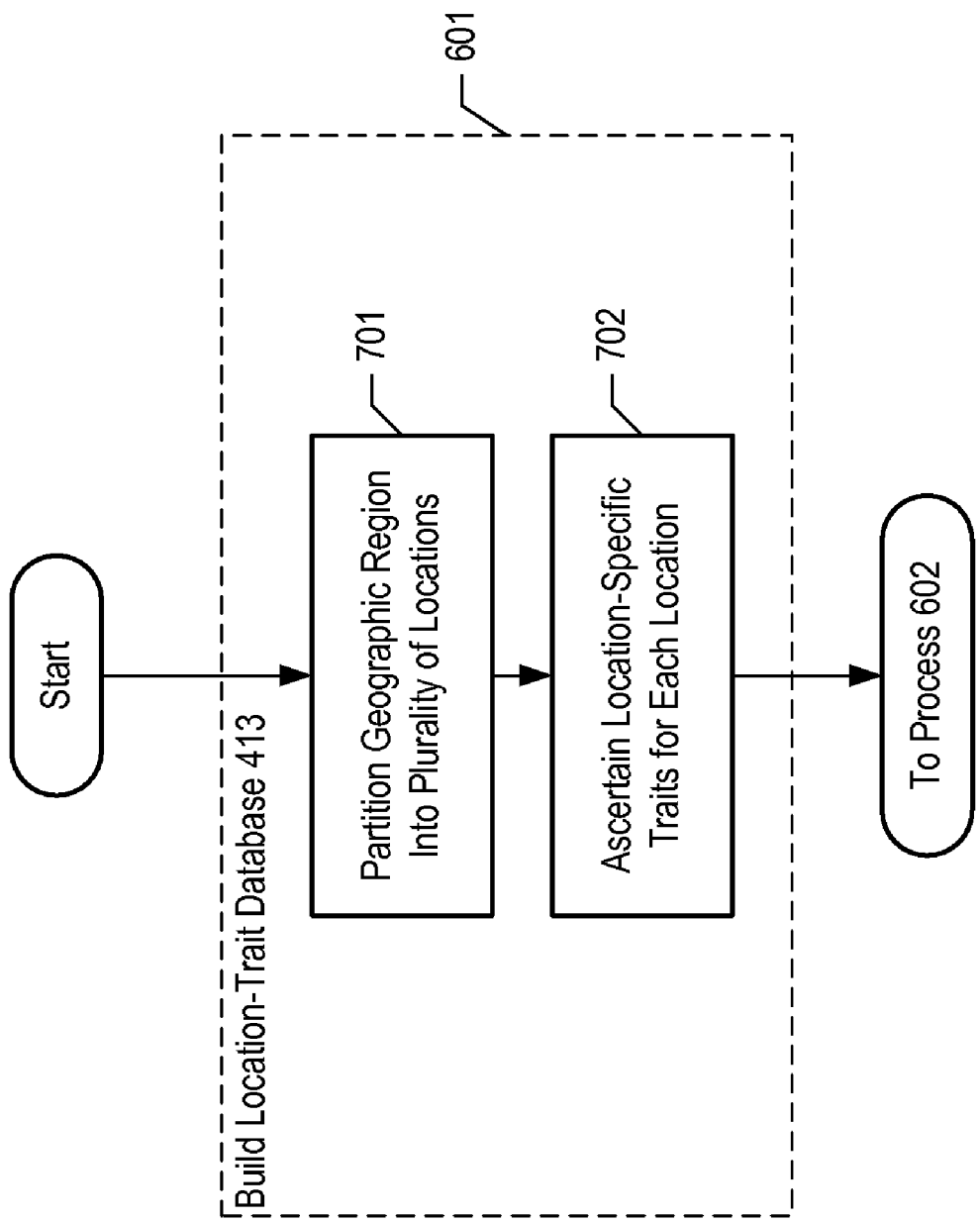
FIG. 7 depicts a flowchart of the salient tasks performed in accordance with task 601—building Location-Trait Database 413.

Building Location-Trait Database 413—FIG. 7 depicts a flowchart of the salient tasks performed in accordance with task 601—building Location-Trait Database 413.

In accordance with task 701, geographic region 220 is partitioned into B(T,N) locations, wherein B(T,N) is a positive integer greater than one, and wherein B(T,N) varies as a function of calendrical time T and the environmental conditions N. It will be clear to those skilled in the art, after reading this disclosure, how to make and use alternative embodiments of the present invention in which the number of locations that geographic region 220 is partitioned into is static. Furthermore, it will be clear to those skilled in the art, after reading this disclosure, how to make and use alternative embodiments of the present invention in which the number of locations that geographic region 220 is partitioned into is not dependent on the calendrical time T or the environmental conditions N.

Some traits of the radio frequency spectrum and of individual signals are different at different locations in geographic region 220. Similarly, some traits of the radio frequency spectrum and of individual signals transmitted by wireless terminal 201 change at base stations 202-1, 202-2, and 202-3 when wireless terminal 201 is at different locations. Furthermore, some traits (e.g., hand-off state, etc.) of wireless telecommunications system 200 change when wireless terminal 201 is at different locations.

When wireless terminal 201 is at a particular location, the values of the traits that vary with the location of wireless terminal 201 represent a "fingerprint" or "signature" for that location that enables location server 214 to estimate the location of wireless terminal 201. For example, suppose that under normal conditions the traits have a first set of values when wireless terminal 201 is at a first location, and a second set of values when wireless terminal 201 is at a second location. Then when wireless terminal 201 is at an unknown location and the traits at that unknown location more closely match the first set of values than the second set, then it is more likely that wireless terminal 201 is at the first location than the second location.

Although human fingerprints and handwritten signatures are generally considered to be absolutely unique, the combination of traits associated with each location might not be absolutely unique in geographic region 220. The effectiveness of the illustrative embodiment is enhanced, however, as differences in the values of the traits among the locations increases. This is consistent with the common-sense notion that the ease of distinguishing two things (e.g., people, cars, buildings, etc.) increases as the differences in their observable traits increase (e.g., all other things being equal, a blonde and a brunette are easier to distinguish than two blondes, etc.). It will be clear to those skilled in the art, after reading this disclosure, how to select locations and traits in order to increase the likelihood that the values of the traits associated with each location are distinguishable from the values of the traits associated with the other locations.

The scope of each location is described by:
i. a unique identifier b, and
ii. its dimensionality (e.g., zero, one, two, three, etc.), and
iii. its coordinates (e.g., latitude, longitude, altitude, etc.), which can be static or, alternatively, can vary as a function of calendrical time T or the environmental conditions N, or both the calendrical time T and the environmental conditions N, and
iv. the expected value E(b, T, N, W, Q) for each trait, Q, when wireless terminal W is at location b at calendrical time T given environmental conditions, N, and
v. the identity of the location(s) that are adjacent to it, and
vi. the staying and moving probabilities $P_S$(b, T, N, W) and $P_M$(b, T, N, W, c).

In accordance with the illustrative embodiment, the identifier b of each location is an arbitrarily-chosen positive integer. It will be clear to those skilled in the art, after reading this disclosure, how to make and use alternative embodiments of the present invention in which the identifier of some or all locations is not arbitrarily chosen. Furthermore, it will be clear to those skilled in the art, after reading this disclosure, how to make and use alternative embodiments of the present invention in which the identifier of some or all locations is not a positive integer.

In accordance with the illustrative embodiment, the scope of each location is three-dimensional and is described by:

(i) one or more three-dimensional coordinates and geometric identifiers that define its boundaries, and
(ii) a three-dimensional coordinate that resides at the centroid of the location, and
(iii) a description of how the scope changes as a function of calendrical time T and environmental conditions N.

It will be clear to those skilled in the art, after reading this disclosure, how to make and use alternative embodiments of the present invention in which the scope of some or all of the locations are zero, one, or two-dimensional. Furthermore, it will be clear to those skilled in the art, after reading this disclosure, how to make and use alternative embodiments of the present invention in which the scope of some or all of the locations are not a function of calendrical time T or environmental conditions N.

In accordance with the illustrative embodiment, the scope of two or more locations can overlap at zero, one, two, more than two but less than all, or all points of latitude and longitude (e.g., an overpass and underpass, different stories in a multi-story building as described below, etc.).

In accordance with the illustrative embodiment, the boundaries of each location are based, at least in part, on:
i. natural and man-made physical attributes of geographic region 220 (e.g., buildings, sidewalks, roads, tunnels, bridges, hills, walls, water, cliffs, rivers, etc.),
ii. legal laws governing geographic region 220 (e.g., laws that pertain to the location and movement of people and vehicles, etc.),
iii. theoretical predictions and empirical data regarding the location and movement of individuals and groups of people and vehicles in geographic region 220,
iv. the desired accuracy of the estimates made by location server 214, and
v. patterns of the location and movement of people and vehicles within geographic region 220,
vi. the calendrical time T, and
vii. the environmental conditions N,
subject to the following considerations:

First, the accuracy with which wireless terminal 201 can be located potentially increases with smaller location sizes. Not all locations need to be the same size, however, and areas requiring greater accuracy can be partitioned into smaller sizes, whereas areas requiring less accuracy can be partitioned into larger sizes.

Second, as the number of locations in geographic region 220 increases, so does the computational burden on location server 214 as described below with respect to FIG. 10.

Third, as the size of adjacent locations decreases, the likelihood increases that the expected values for the traits in those locations will be identical or very similar, which can hinder the ability of location server 214 to correctly determine when wireless terminal 201 is in one location versus the other.

With these considerations in mind, it will be clear to those skilled in the art, after reading this disclosure, how to make and use alternative embodiments of the present invention that partition geographic region 220 into any number of locations of any size, shape, and arrangement. Furthermore, it will be clear to those skilled in the art, after reading this disclosure, how to make and use embodiments of the present invention in which the locations are identical in size and shape.

Figure 8A:
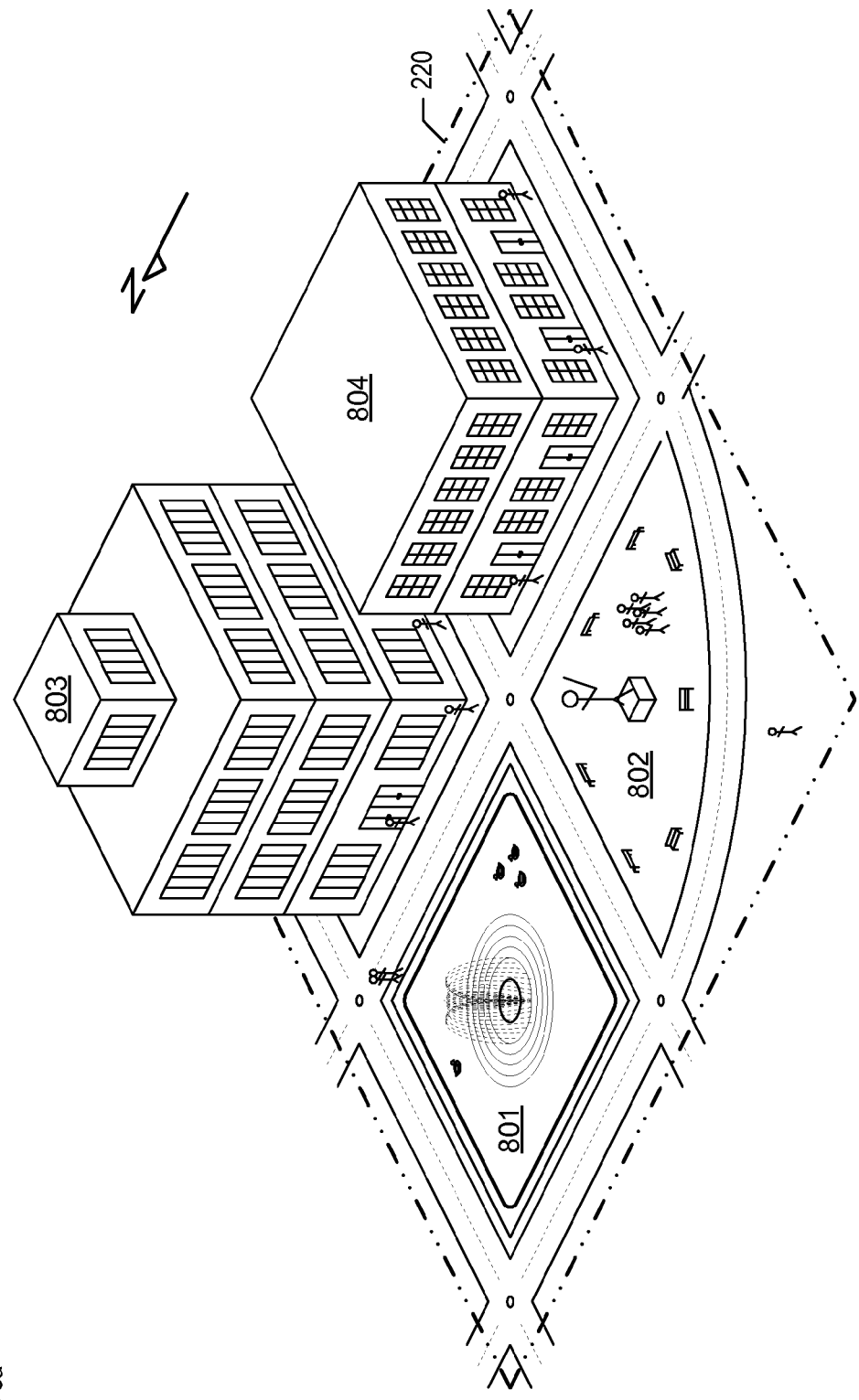
FIGS. 8a through 8n each depict a representation of a geographic region.
Figure 8B:
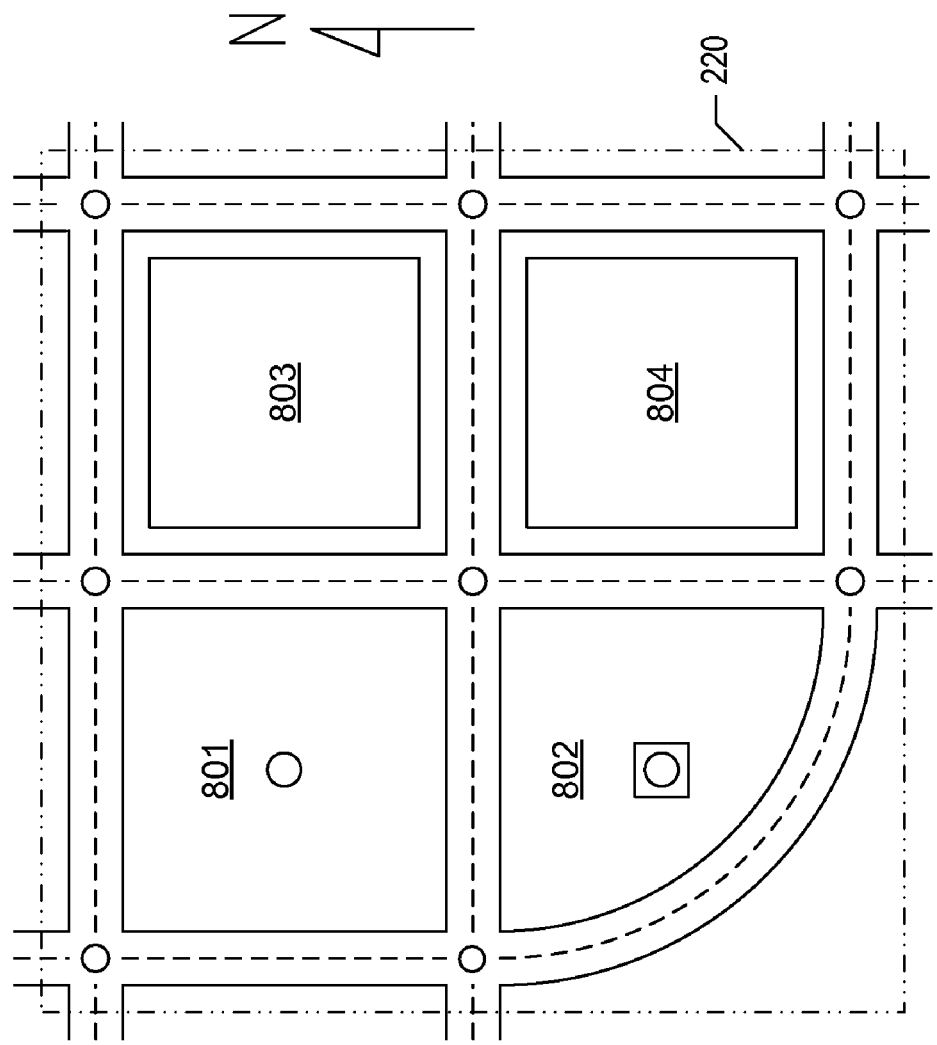

FIG. 8a depicts an isometric drawing of the salient features in geographic region 220 and FIG. 8b depicts a bird's eye map of the salient features geographic region 220. Geographic region 220 comprises water fountain 601, park 602, four-story building 603, two-story building 604, various streets, sidewalks, and other features that are partitioned into 28 locations as described below and depicted in FIGS. 6c through 6e. Although geographic region 220 comprises approximately four square blocks in the illustrative embodiment, it will be clear to those skilled in the art how to make and use alternative embodiments of the present invention with geographic regions of any size, topography, and complexity.

Figure 8C:
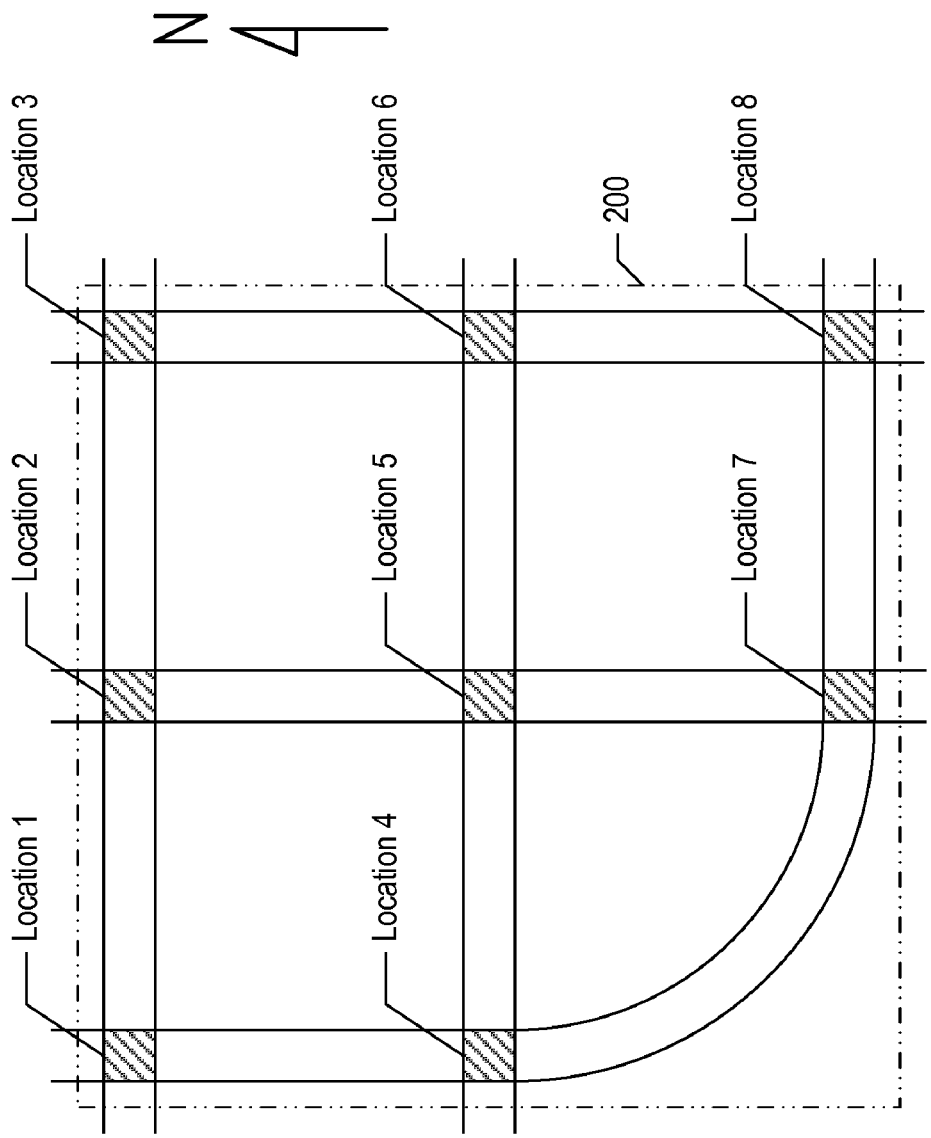
Figure 8D:
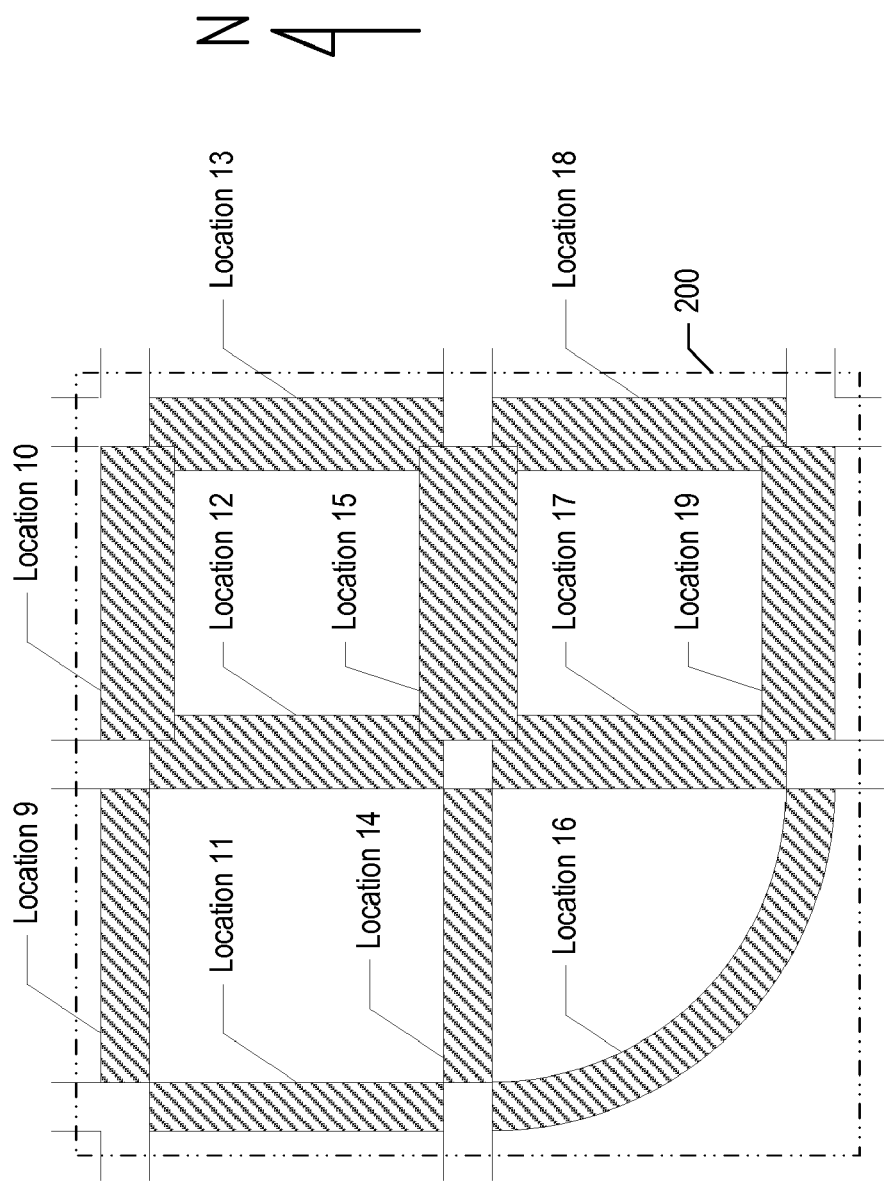
Figure 8E:
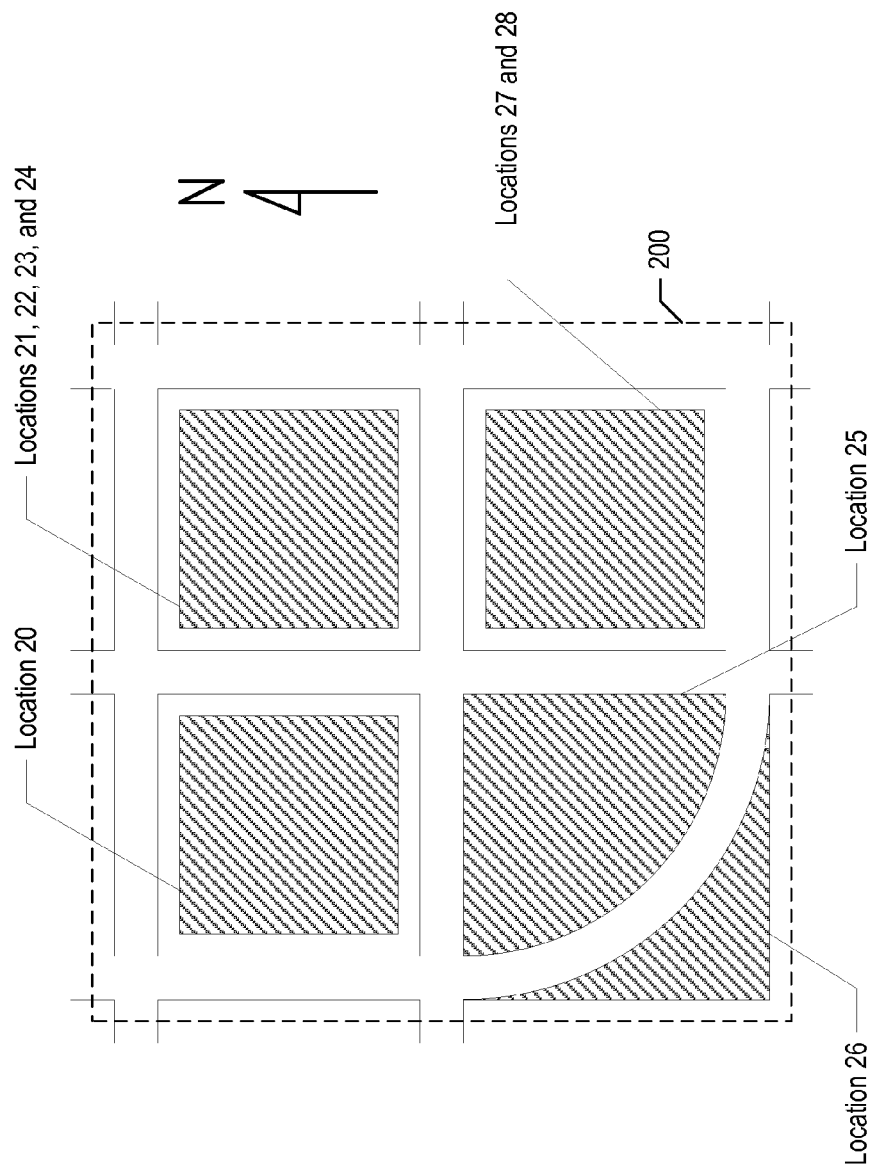

In accordance with the illustrative embodiment, the eight road intersections are partitioned into Locations 1 through 8, as depicted in FIG. 8c. In accordance with the illustrative embodiment, the street sections and their adjacent sidewalks up to the edge of buildings 603 and 604 are partitioned into Locations 9 through 19, as depicted in FIG. 8d. In accordance with the illustrative embodiment, and as depicted in FIG. 8e, water fountain 601 is partitioned into Location 20, park 602 is partitioned into Location 25, each floor of building 604 is classified as one of Locations 21, 22, 23, and 24, and each floor of building 603 is classified as of one of Locations 27 and 28. It will be clear to those skilled in the art, however, after reading this disclosure, how to partition geographic region 220 into any number of locations of any size and shape.

Figure 8F:
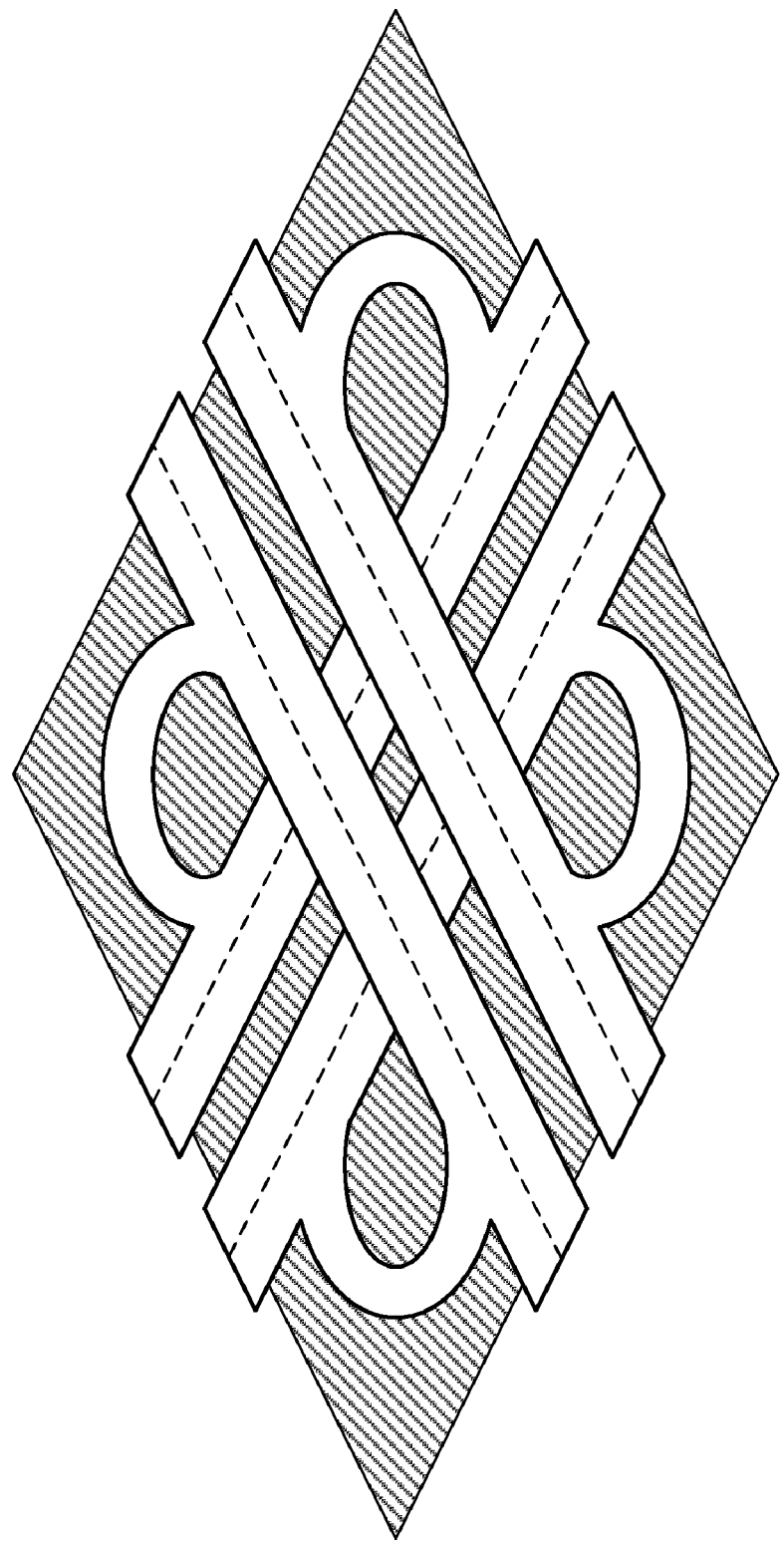
Figure 8G:
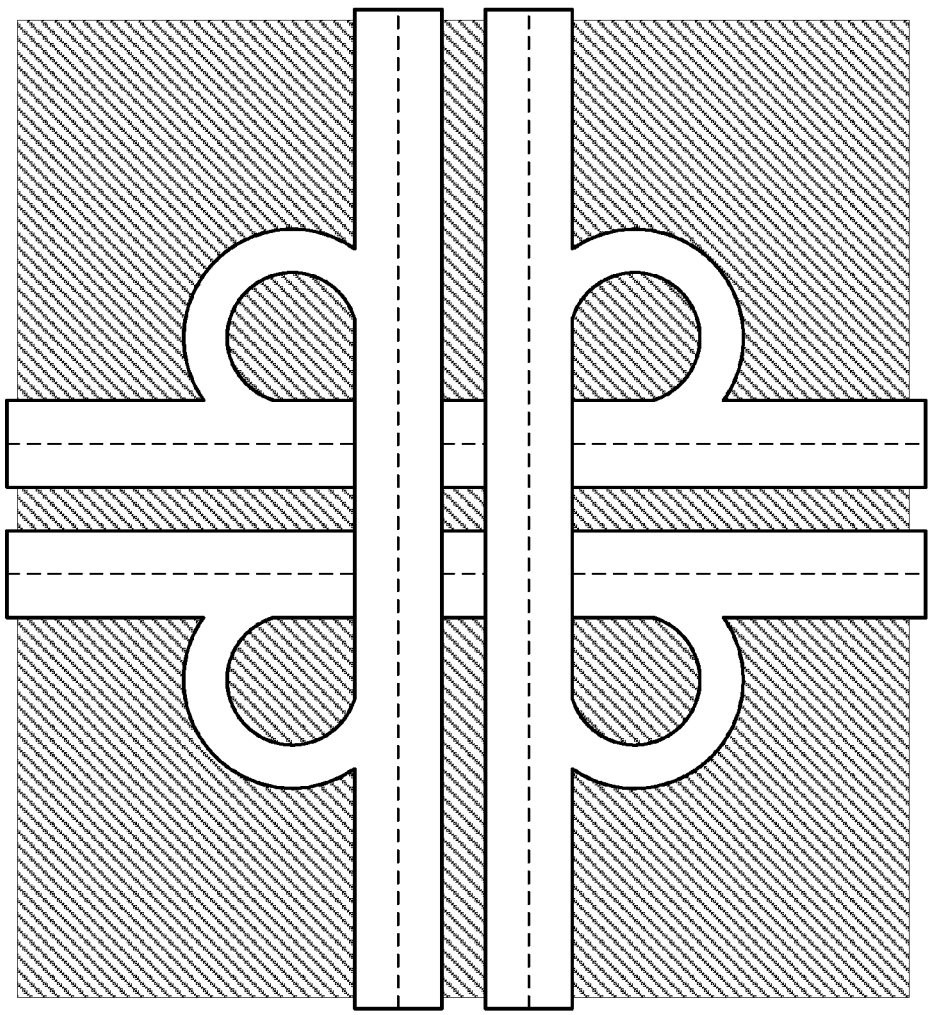
Figure 8H:
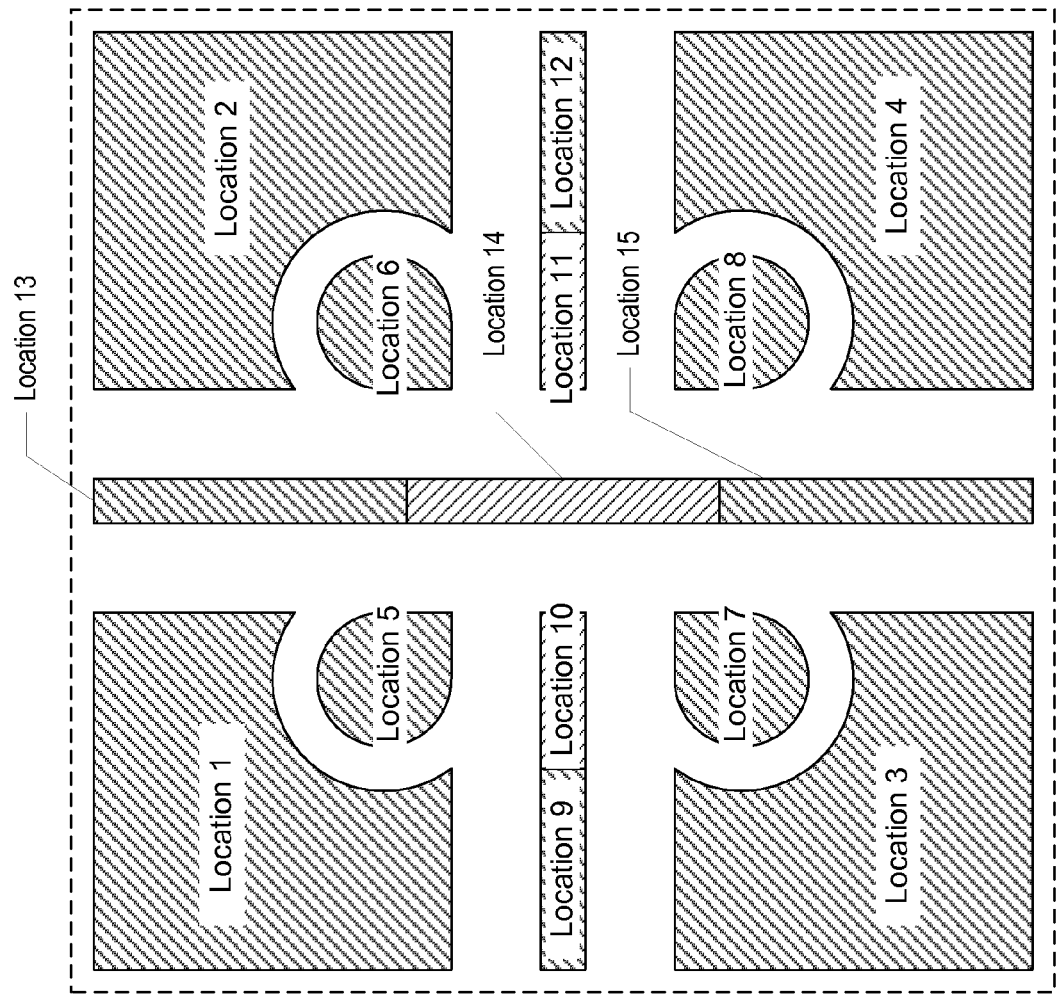
Figure 8I:
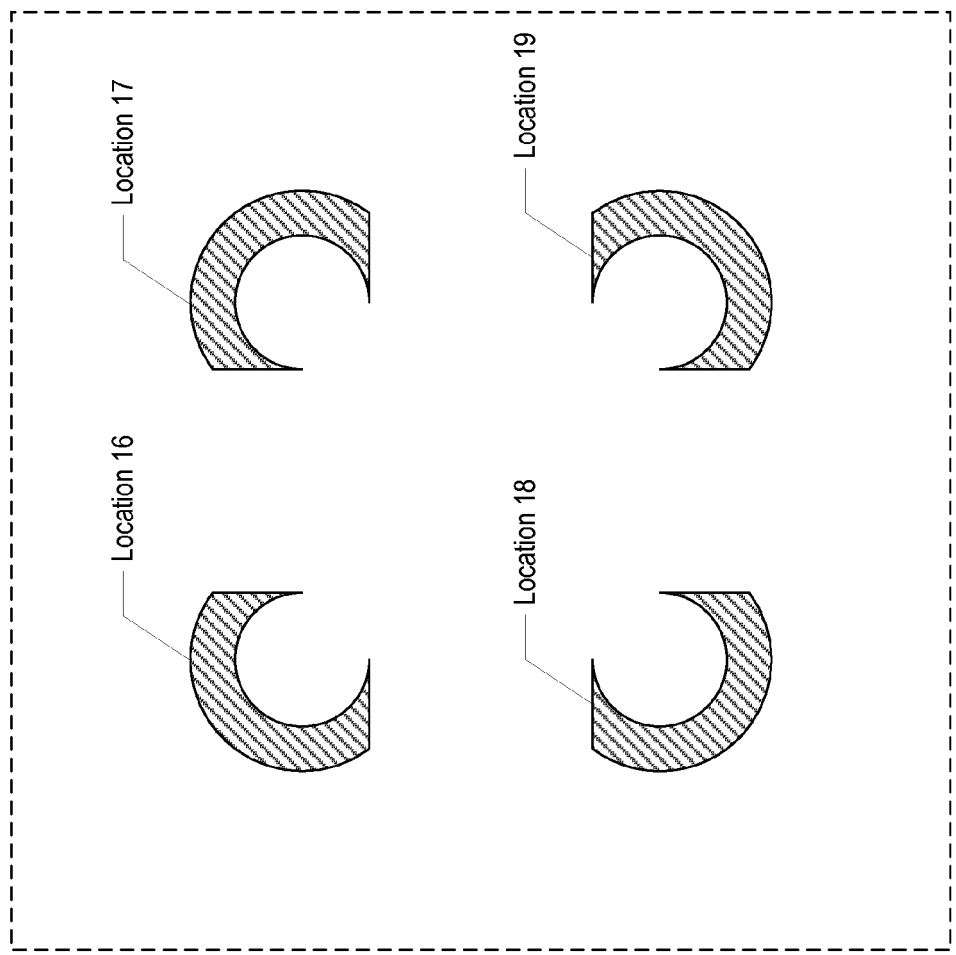
Figure 8J:
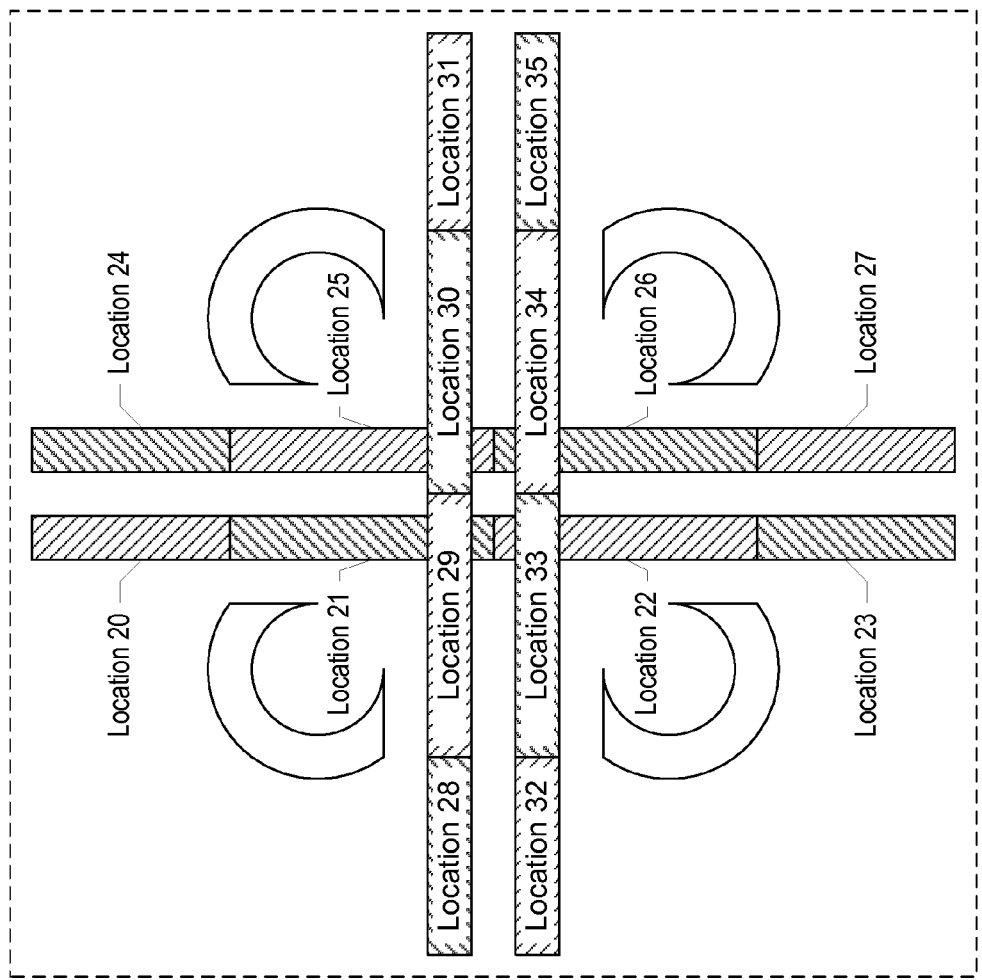
Figure 8K:
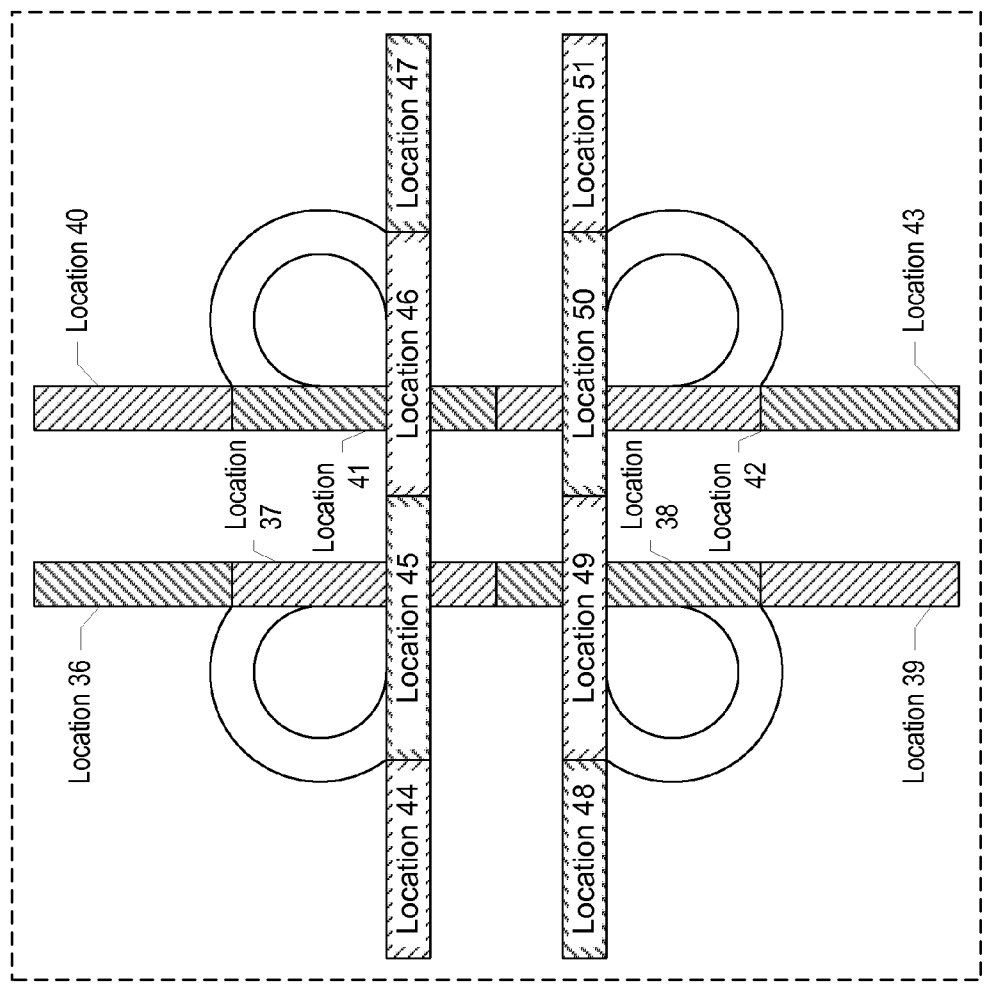

In accordance with an alternative embodiment of the present invention, a geographic region that comprises a clover-leaf intersection of two, four-lane divided highways is partitioned into 51 locations. FIG. 8f depicts an isometric drawing of the salient features of the intersection, and FIG. 8g depicts a bird's eye map of the intersection. In accordance with the illustrative embodiment, the grass and medians have been partitioned into 15 locations as depicted in FIG. 8h, the four ramps have been partitioned into four locations as depicted in FIG. 8i, the inner or "passing" lanes have been partitioned into eight locations as depicted in FIG. 8j, and the outer or "travel" lanes have been partitioned into eight locations as depicted in FIG. 8k.

Figure 8L:
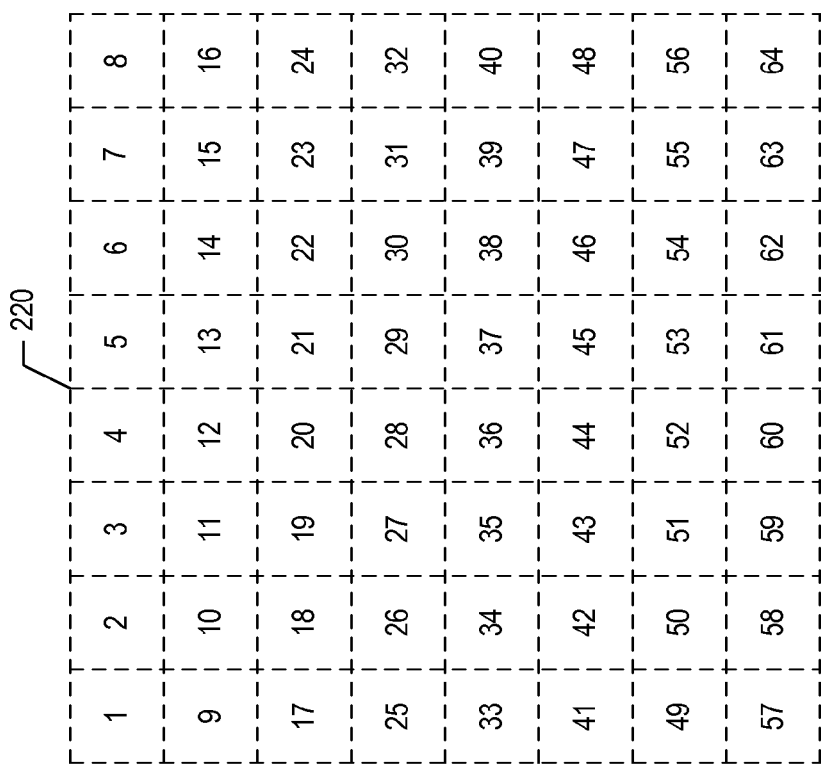

FIG. 8L depicts an alternative partitioning of geographic region 220 into 64 square locations.

In accordance with task 702, the expected values E(b, T, N, W, Q) for the following traits are associated with each location:

i. the expected pathloss of all of the signals receivable by wireless terminal 201 when wireless terminal 201 is at the location, from all transmitters (e.g., base stations 202-1, 202-2, and 202-3, commercial television, commercial radio, navigation, ground-based aviation, etc.), as a function of the calendrical time, T, and the environmental conditions, N; and ii. the expected pathloss of all of the signals transmitted by wireless terminal 201 when wireless terminal 201 is in the location as receivable at base stations 202-1, 202-2, and 202-3, as a function of the calendrical time, T, and the environmental conditions, N; and iii. the expected received signal strength of all of the signals receivable by wireless terminal 201 when wireless terminal 201 is in the location, from all transmitters, as a function of the calendrical time, T, and the environmental conditions, N; and iv. the expected received signal strength of all of the signals transmitted by wireless terminal 201 when wireless terminal 201 is in the location as receivable at base stations 202-1, 202-2, and 202-3, as a function of the calendrical time, T, and the environmental conditions, N; and v. the expected received signal-to-impairment ratio (e.g., Eb/No, etc.) of all of the signals receivable by wireless terminal 201 when wireless terminal 201 is in the location, from all transmitters, as a function of the calendrical time, T, and the environmental conditions, N; and vi. the expected received signal-to-impairment ratio of all of the signals transmitted by wireless terminal 201 when wireless terminal 201 is in the location as receivable at base stations 202-1, 202-2, and 202-3, as a function of the calendrical time, T, and the environmental conditions, N; and vii. the expected received temporal difference of each pair of multipath components (e.g., one temporal difference for one pair of multipath components, a pair of temporal differences for a triplet of multipath components, etc.) of all of the signals receivable by wireless terminal 201 when wireless terminal 201 is in the location, from all transmitters, as a function of the calendrical time, T, and the environmental conditions, N; and viii. the expected received temporal difference of each pair of multipath components (e.g., one temporal difference for one pair of multipath components, a pair of temporal differences for a triplet of multipath components, etc.) of all of the signals transmitted by wireless terminal 201 when wireless terminal 201 is in the location as receivable at base stations 202-1, 202-2, and 202-3, as a function of the calendrical time, T, and the environmental conditions, N; and ix. the expected received delay spread (e.g., RMS delay spread, excess delay spread, mean excess delay spread, etc.) of all of the signals receivable by wireless terminal 201 when wireless terminal 201 is in the location, from all transmitters, as a function of the calendrical time, T, and the environmental conditions, N; and x. the expected received delay spread (e.g., RMS delay spread, excess delay spread, mean excess delay spread, etc.) of all of the signals transmitted by wireless terminal 201 when wireless terminal 201 is in the location as receivable at base stations 202-1, 202-2, and 202-3, as a function of the calendrical time, T, and the environmental conditions, N; and xi. the expected received relative arrival times of two or more multipath components of all of the signals receivable by wireless terminal 201 when wireless terminal 201 is in the location, from all transmitters (which can be determined by a rake receiver in well-known fashion), as a function of the calendrical time, T, and the environmental conditions, N; and xii. the expected received relative arrival times of two or more multipath components of all of the signals transmitted by wireless terminal 201 when wireless terminal 201 is in the location as receivable at base stations 202-1, 202-2, and 202-3, as a function of the calendrical time, T, and the environmental conditions, N; and xiii. the expected round-trip time of all of the signals transmitted and receivable by wireless terminal 201 through base stations 202-1, 202-2, and 202-3, as a function of the calendrical time, T, and the environmental conditions, N; and xiv. the expected round-trip time of all of the signals transmitted and receivable by base stations 202-1, 202-2, and 202-3 through wireless terminal 201, as a function of the calendrical time, T, and the environmental conditions, N; and xv. the identity of the base stations that provide telecommunications service to the location, as a function of the calendrical time, T, and the environmental conditions, N; and xvi. the identities of the neighboring base stations that provide telecommunications service to the location, as a function of the calendrical time, T, and the environmental conditions, N; and xvii. the handover state (e.g., soft, softer, 1×, 2×, etc.) of wireless terminal 201 and wireless telecommunication system 200 when wireless terminal 201 is in the location as a function of the calendrical time, T, and the environmental conditions, N.

In accordance with the illustrative embodiment of the present invention, all signals transmitted by wireless terminal 201 are for communicating with base stations 202-1 through 202-3, and all of the signals received by wireless terminal 201 are:

signals transmitted by base stations 202-1 through 202-3 for communicating with wireless terminal 201,
    television signals,
    radio signals,
    aviation signals, and
    navigation signals.

It will be clear to those skilled in the art, after reading this disclosure, how to make and use alternative embodiments of the present invention that use different signals.

In accordance with the illustrative embodiment, the expected values of these traits are determined through a combination of:

i. a plurality of theoretical and empirical radio-frequency propagation models, and
    ii. a plurality of empirical measurements of the traits within geographic region 220, in well-known fashion. The empirical measurements of the traits are stored within location-trait database 413 and updated periodically.

In accordance with the illustrative embodiment of the present invention, each location b is described by the identities of its adjacent locations, (i.e., the locations that wireless terminal 201 can reasonably move into from location b within one time step $\Delta t$.) In accordance with the illustrative embodiment, two locations are considered to be "adjacent" when and only when they have at least two points in common. It will be clear to those skilled in the art, however, after reading this disclosure, how to make and use alternative embodiments of the present invention in which two locations are considered adjacent when they have zero points in common, or alternatively, when they have one point in common.

Figure 8M:
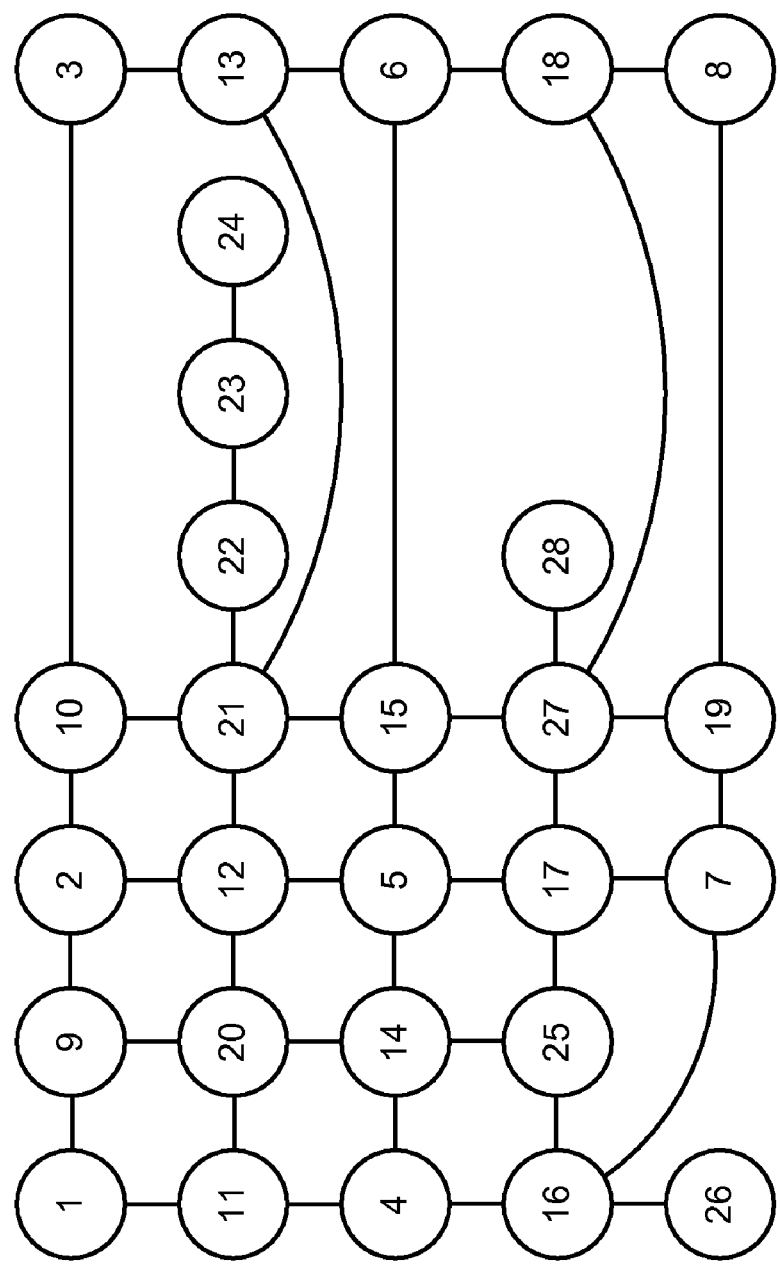
Figure 8N:
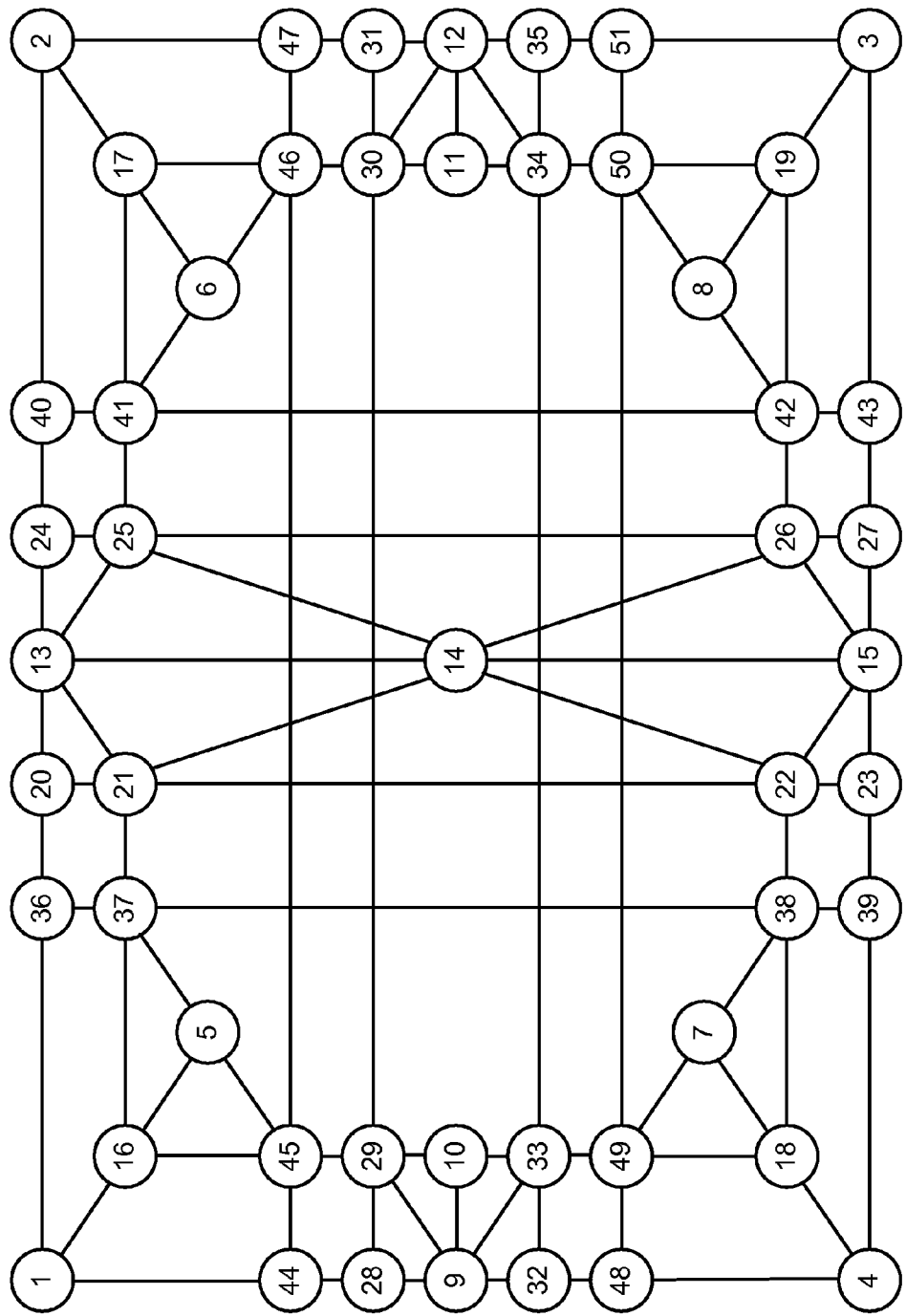

Adjacency Graph—In accordance with the illustrative embodiment, a data structure is created that indicates which locations are adjacent. This data structure is called an "adjacency graph" and it is stored within Location-Trait Database 413 as a sparse-matrix. FIG. 8m depicts a graphical representation of the adjacency graph for the 28 locations that compose geographic area 220, and FIG. 8n depicts a graphical representation of the adjacency graph for the 51 locations that compose the highway intersection in FIGS. 8f through 8k.

As described in detail below and in the accompanying figures, the adjacency graph is used in the temporal analysis of wireless terminal 201's movements. It will be clear to those skilled in the art, after reading this disclosure, how to make the adjacency graph for any partitioning of geographic region 220.

In accordance with the illustrative embodiment, the staying and moving probabilities $P_S(b, T, N, W)$ and $P_M(b, T, N, W, c)$ for all b are generated based on a model of the movement of wireless terminal W that considers:

i. the topology of the adjacency graph; and
    ii. the calendrical time T; and
    iii. the environmental conditions N; and
    iv. the natural and man-made physical attributes that affect the location and movement of wireless terminals and the entities that carry them (e.g., buildings, sidewalks, roads, tunnels, bridges, hills, walls, water, cliffs, rivers, etc.); and
    v. the legal laws governing the location and movement of wireless terminals and the entities that carry them (e.g., one-way streets, etc.); and
    vi. the past data for the movement of all wireless terminals; and
    vii. the past data for the movement of wireless terminal W.

It will be clear to those skilled in the art, after reading this disclosure, how to make and use alternative embodiments of the present invention that use any subcombination of i, ii, iii, iv, v, vi, and vii to generate the staying and moving probabilities for each location b.

The moving probabilities $P_M(b, T, N, W, c)$ associated with a location b can be considered to be either isotropic or non-isotropic. For the purposes of this specification, "isotropic moving probabilities" are defined as those which reflect a uniform likelihood of direction of movement and "non-isotropic moving probabilities" are defined as those which reflect a non-uniform likelihood of direction of movement. For example, for locations arranged in a two-dimensional regular hexagonal grid the values of $P_M(b, T, N, W, c)$ of location b are isotropic if and only if they are all equal (e.g., $P_M(b, T, N, W, c) = \frac{1}{6}$ for each adjacent location c). Conversely, the values of $P_M(b, T, N, W, c)$ are non-isotropic if there are at least two probabilities with different values. As another example, for locations arranged in a two-dimensional "checkerboard" grid, the values of $P_M(b, T, N, W, c)$ are isotropic if and only if:

(i) the north, south, east, and west moving probabilities out of location b all equal p,
    (ii) the northeast, northwest, southeast, and southwest moving probabilities out of location b all equal $p/\sqrt{2}$, and
    (iii) $4p(1+1/\sqrt{2})+P_S(b, T, N, W)=1$.

Isotropic moving probabilities are simple to generate, but are considerably less accurate than non-isotropic moving probabilities that are generated in consideration of the above criteria. Therefore, in accordance with the illustrative embodiment, the moving probabilities are non-isotropic, but it will be clear to those skilled in the art, after reading this disclosure, how to make and use alternative embodiments of the present invention that use isotropic moving probabilities.

Figure 9:
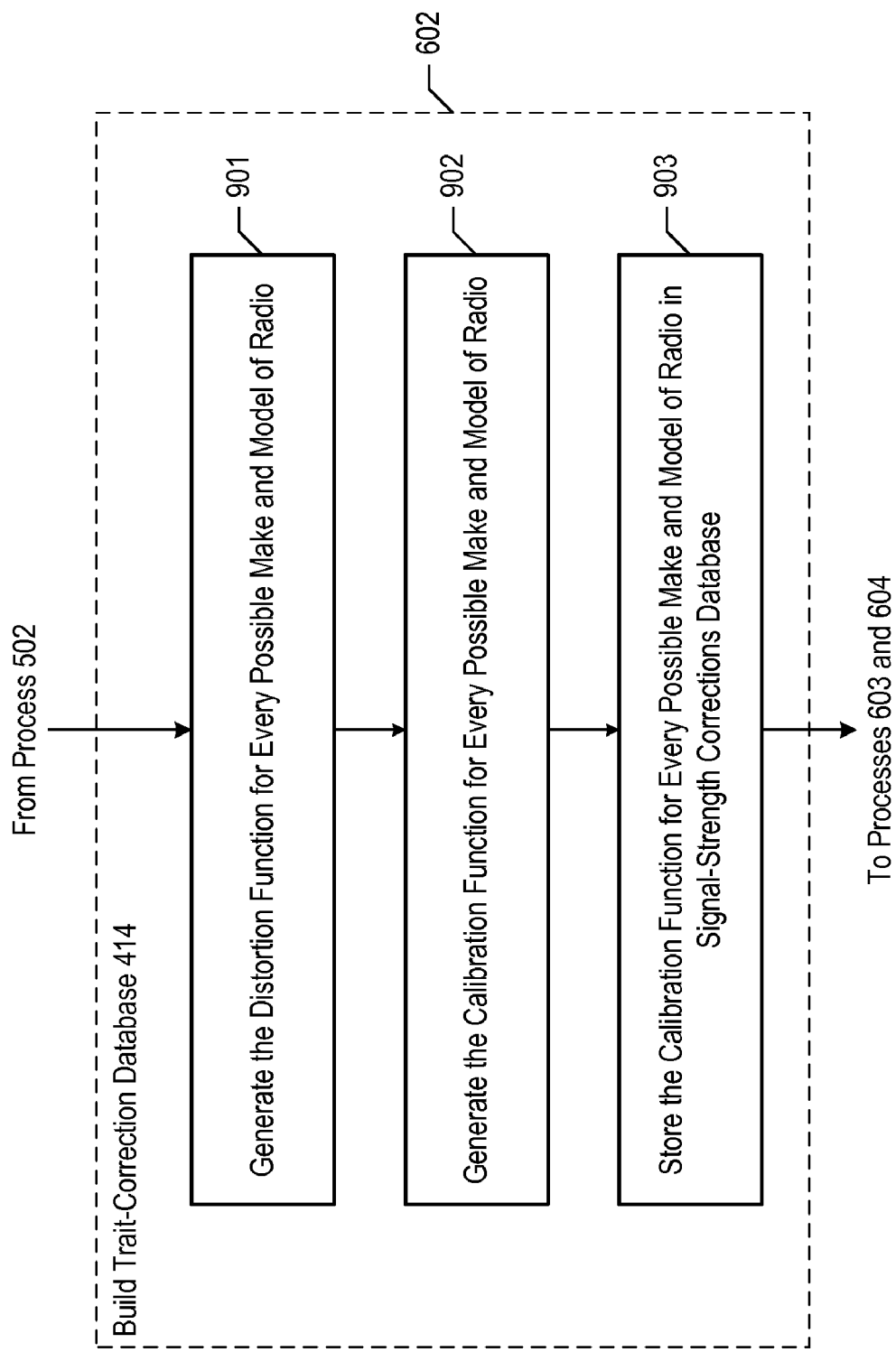
FIG. 9 depicts a flowchart of the salient tasks performed as part of task 602: populating Trait-Correction Database 414.

Populating Trait-Correction Database 414—FIG. 9 depicts a flowchart of the salient tasks performed as part of task 602: populating Trait-Correction Database 414.

In general, the ability of location server 214 to estimate the location of wireless terminal 201 is limited by the accuracy with which the traits are measured by wireless terminal 201 and by base stations 202-1, 202-2, and 202-3. When the nature or magnitude of the measurement errors is unpredictable, there is little that can be done to compensate for them.

In contrast, when the nature and magnitude of the measurement errors are predictable, they can be corrected, and the nature and magnitude of some measurement errors are, in fact, predictable. For example, one make and model of wireless terminal is known to erroneously measure and report the signal strength of signals by −2 dB. If the measurements from this model of wireless terminal are left uncorrected, this −2 dB error could yield a bad estimate for the location of the wireless terminal. In contrast, 2 dB were added to the measurements from that make and model of wireless terminal, the likelihood of a bad estimate the location of the wireless terminal would be reduced.

To this end, Trait-Correction Database 414 comprises the information needed by location server 214 and wireless terminal 201 to be aware of systemic measurement errors and to correct them. A technique for eliminating some situational errors in the measurements is described below and in the accompanying figures.

In accordance with task 901, a distortion function is generated for every radio that might provide measurements for every trait whose measurements can be erroneous.

In general, the distortion function D(A,K,Q) relates the reported measurement R for a trait Q to the actual value A for that trait and the defining characteristic K of the radio making the measurement:

$$R = D(A,K,Q). \quad \text{(Eq. 1)}$$

In accordance with the illustrative embodiment, the distortion function D(A,K,Q) is provided to the owner/operator of location server 214 by the radio manufacturer. It will be clear to those skilled in the art, however, after reading this disclosure, how to generate the distortion function D(A,K,Q) for any radio without the assistance of the radio manufacturer.

Figure 10A:
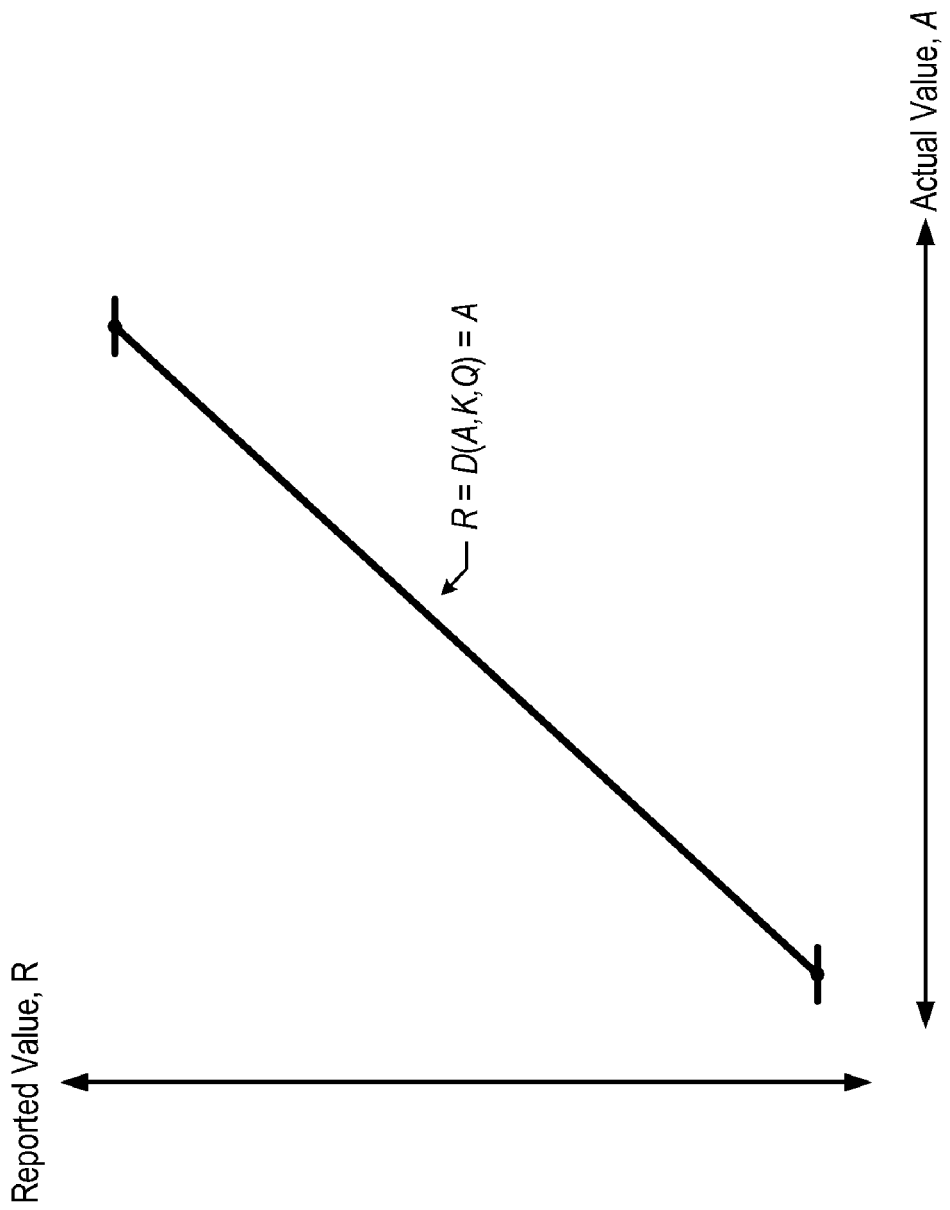
FIG. 10a depicts the distortion function D(A,K,Q) for one trait and for an ideal radio.

An ideal radio perfectly measures and reports the value of the traits it receives and the distortion function D(A,K,Q) for one trait and for an ideal radio is depicted in FIG. 10*a*. As can be seen from the graph in FIG. 10*a*, the salient characteristic of an ideal radio is that the reported value of the measurement, R, is exactly equal to the actual value of the trait A at the radio (i.e., there is no measurement or reporting error).

Figure 10B:
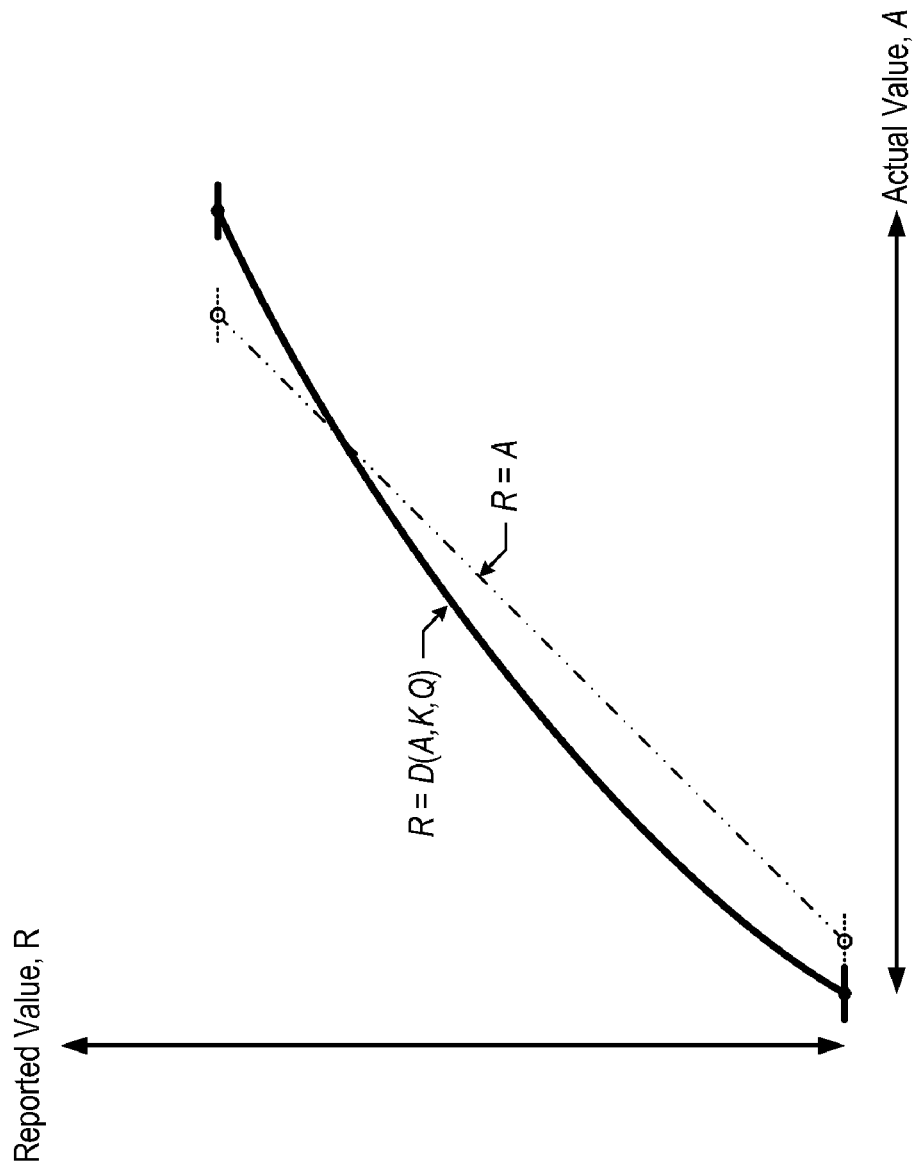
FIG. 10b depicts a graph of the distortion function of an illustrative real-world radio.

In contrast, most real-world radios do not perfectly measure the traits of the signals they receive. This is particularly true for measurements of signal-strength where the errors can be large. For example, FIG. 10*b* depicts a graph of the distortion function of an illustrative real-world radio. In this case, the reported measurement is too high for some values, too low for others, and correct for only one value.

The nature and magnitude of each of the errors in the reported measurements is inherent in the distortion function D(A,K,Q), and, therefore, knowledge of the distortion function enables the measurement errors to be compensated for. In other words, when location server 214 knows exactly how a radio distorts a measurement, it can correct—or calibrate—the reported measurement with a calibration function to derive the actual value of the trait. The calibration function, denoted C(R,K,Q), is generated in task 902.

In accordance with the illustrative embodiment, the distortion function D(A,K,Q) for all measurements is represented in tabular form. For example, the distortion function for one type of signal-strength measurement for various radios is shown in Table 1. It will be clear to those skilled in the art, after reading this disclosure, however, how to make and use alternative embodiments of the present invention in which the distortion function for some or all measurements is not represented in tabular form. Furthermore, it will be clear to those skilled in the art, after reading this disclosure, how to make and use alternative embodiments of the present invention that comprise distortion functions for any type of measurement of any type of trait and for any radio.

TABLE 1

The Distortion function D(A, K, Q) in Tabular Form

| A | R = D(A, K, Q) | | |
|---|---|---|---|
| | K = Motorola Model A008; Q = Signal Strength | ... | K = Samsung Model A800; Q = Signal Strength |
| −110 | −115 | ... | −107 |
| −109 | −114 | ... | −106 |
| ... | ... | ... | ... |
| −48 | −38 | ... | −50 |
| −47 | −37 | ... | −49 |

The purpose of the characteristic, K, is to identify which calibration function should be used in calibrating the reported measurements from wireless terminal 201, and, therefore, the characteristic, K, should be as indicative of the actual distortion function for wireless terminal 201 as is economically reasonable.

For example, the characteristic, K, can be, but is not limited to:

i. the unique identity of wireless terminal 201 (e.g., its electronic serial number ("ESN"), its international mobile station identifier ("IMSI"), its temporary international mobile station identifier ("TIMSI"), mobile station identification ("MSID"), its directory number ("DN"), etc.); or ii. the model of wireless terminal 201 (e.g., Timeport 210*c*, etc.); or iii. the make (i.e., manufacturer) of wireless terminal 201 (e.g., Motorola, Samsung, Nokia, etc.); or iv. the identity of the radio-frequency circuitry of wireless terminal 201 (e.g., Motorola RF circuit design 465LFRB, etc.); or v. the identity of one or more components of wireless terminal 201 (e.g., the part number of the antenna, the part number of the measuring component, etc.); or viii. any combination of i, ii, iii, iv, v, vi, and vii.

The most accurate characteristic is the unique identity of wireless terminal 201 because that would enable location server 214 to use the calibration function generated for that very wireless terminal. It is unlikely, however, that this is economically feasible because it would require that every wireless terminal be tested to determine its own unique distortion function.

On the other hand, using only the make of wireless terminal 201 as the characteristic, K, is economically reasonable, but it is unlikely that a single calibration function for all of a manufacturer's wireless terminals would provide very accurate calibrated signal-strength measurements.

As a compromise, the illustrative embodiment uses the combination of make and model of wireless terminal 201 as the characteristic, K, because it is believed that the amount of variation between wireless terminals of the same make and model will be small enough that a single calibration function for that model should provide acceptably accurate calibrated measurements for every wireless terminal of that make and model.

It will be clear to those skilled in the art, however, after reading this disclosure, how to make and use alternative embodiments of the present invention in which the characteristic, K, is based on something else.

In accordance with task 902, the calibration function C(R, K,Q) is generated for every radio that might provide measurements to location server 214 or wireless terminal 201 and for every trait whose measurements can be distorted.

In general, the calibration function C(R,K,Q) relates the calibrated measurement S of a trait Q, to the reported measurement R of trait Q and the defining characteristic K of the radio making the measurement:

$$S = D(R,K,Q) \quad \text{(Eq. 2)}$$

Figure 10C:
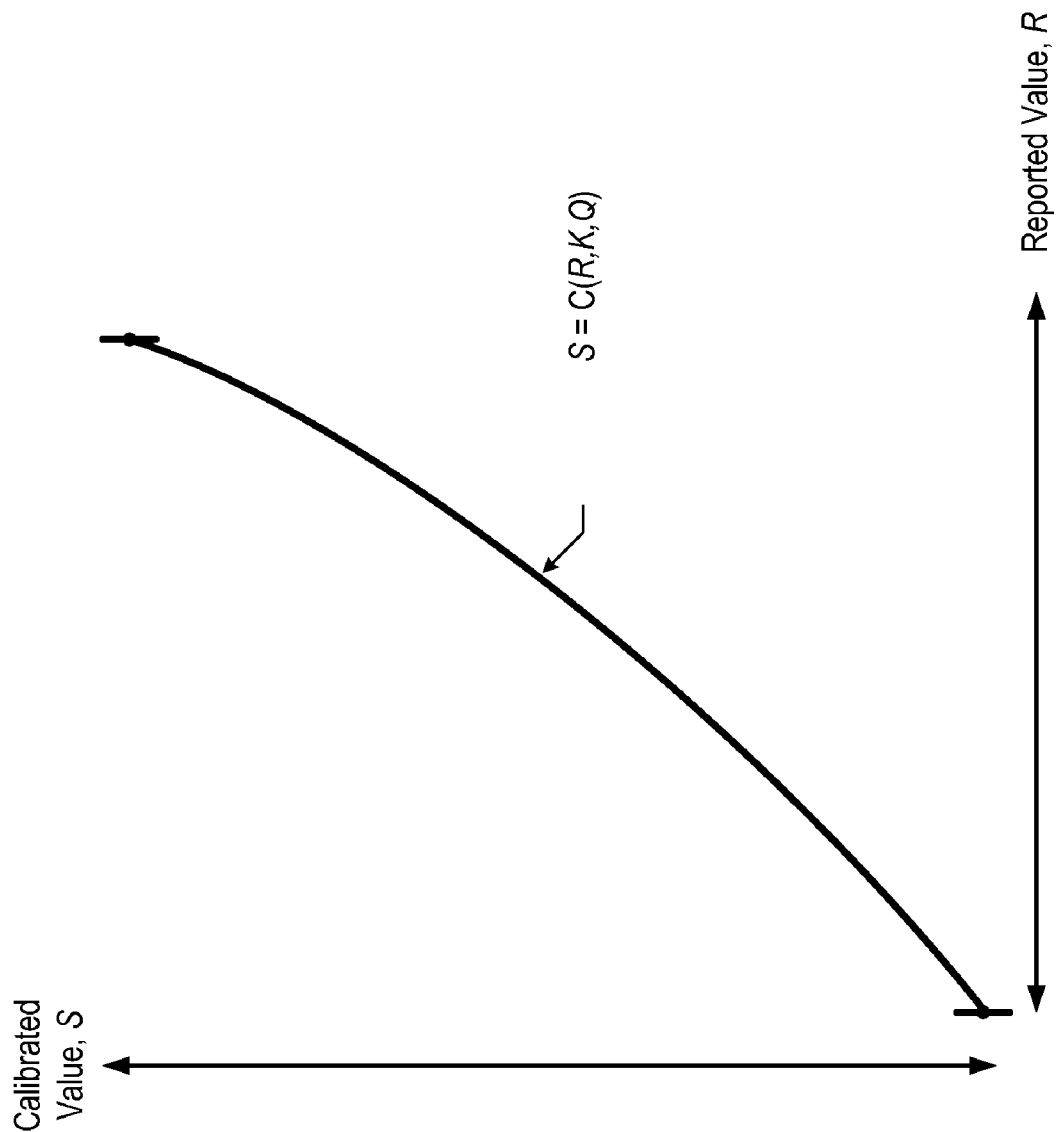
FIG. 10c depicts a graph of the calibration function C(R, K,Q) for the distortion function D(A,K,Q) depicted in FIG. 10b.

The calibration function C(R,K,Q) is the inverse of the distortion function D(A,K,Q). In other words, the salient characteristic of the calibration function C(R,K,Q) is that it satisfies the equation 3:

$$S = A = C(D(A,K,Q),K,Q) \quad \text{(Eq. 3)}$$

so that the calibrated measurement, S, is what the reported measurement, R, would have been had the radio making and reporting the measurement been ideal. It will be clear to those skilled in the art, after reading this disclosure, how to derive C(R,K,Q) from D(A,K,Q). FIG. 10c depicts a graph of the calibration function C(R,K,Q) for the distortion function D(A,K,Q) depicted in FIG. 10b.

In accordance with the illustrative embodiment, the function C(R,K,Q) is represented in tabular form, such as that shown in Table 2.

TABLE 2

The Calibration Function C(R, C, N) in Tabular Form

| | S = C(R, C, N) | | |
|---|---|---|---|
| R | C = Motorola Model A008; Q = Signal Strength | ... | C = Samsung Model A800; Q = Signal Strength |
| −110 | −115 | ... | −107 |
| −109 | −114 | ... | −106 |
| ... | ... | ... | ... |
| −48 | −38 | ... | −50 |
| −47 | −37 | ... | −49 |

In accordance with task 903, the calibration functions C(R, K,Q) are stored in Trait-Correction Database 414.

Figure 11:
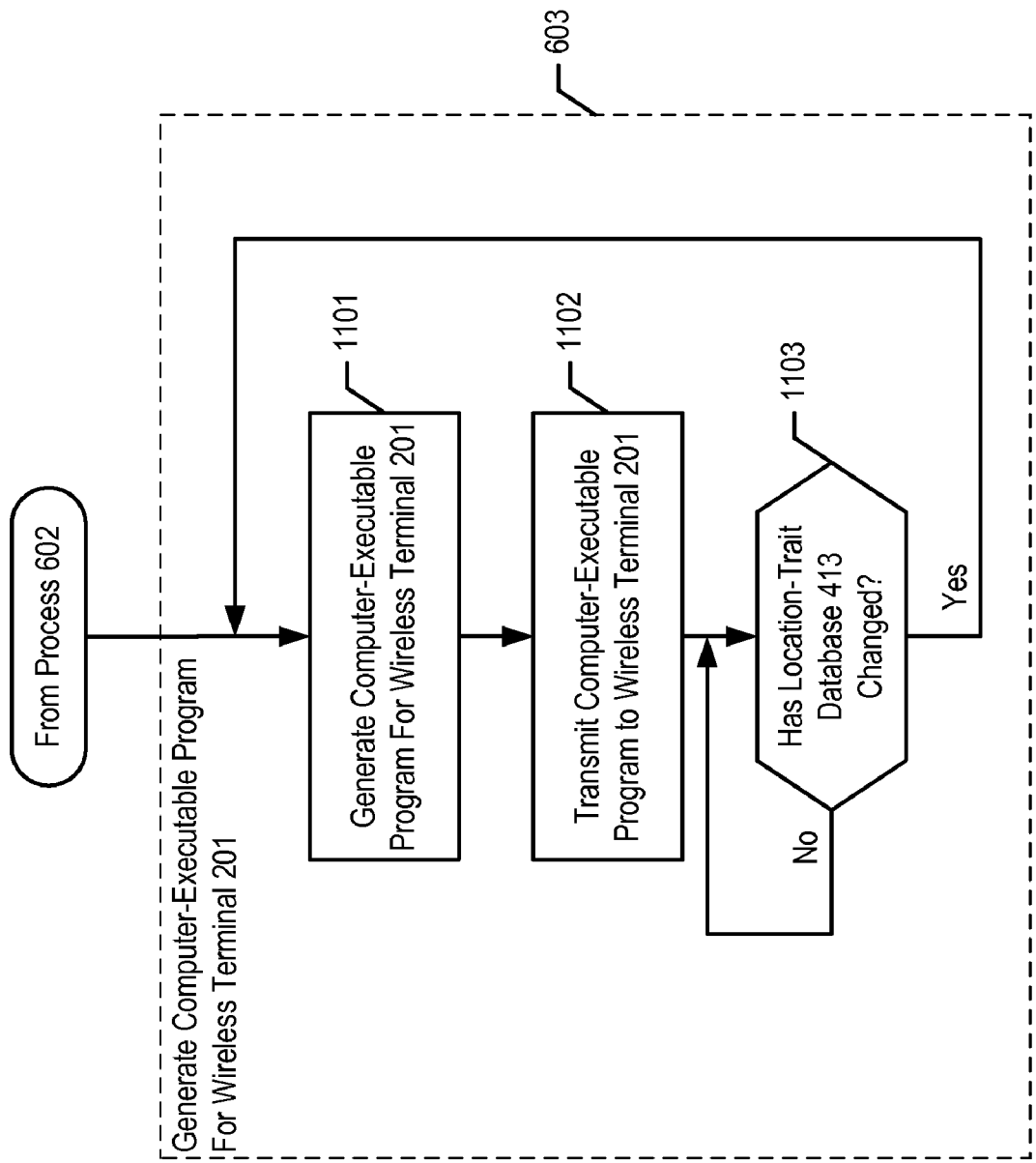
FIG. 11 depicts a flowchart of the salient tasks performed as part of task 603: generating the computer-executable program for wireless terminal 201.

Generate Computer-Executable Program for Wireless Terminal 201—FIG. 11 depicts a flowchart of the salient tasks performed as part of task 603: generating the computer-executable program for wireless terminal 201. In accordance with the illustrative embodiment, task 603 runs continually and concurrently with task 604.

At task 1101, location server 214 generates a computer-executable program for storage and execution on wireless terminal 201. The function of the computer-executable program is to estimate whether or not wireless terminal 201 is present in zone 230 based on one or more measured values of one or more electromagnetic traits of one or more signals. In particular, the computer-executable program estimates whether wireless terminal 201—which is at an unknown location—is present in zone 230 by comparing the measured values of the signals to the expected values of those signals at the location or locations in zone 230.

In accordance with the illustrative embodiment, location server 214 generates the computer-executable program based on:
  i. one or more expected values of one or more electromagnetic traits of one or more signals for one or more locations in zone 230 as stored in Location-Trait Database 413, and
  ii. the pair-wise difference in the expected values of one or more electromagnetic traits (e.g., signal strength, etc.) of one or more pairs or signals that are observable in zone 230, and
  iii. the calibration function C(R,K,Q) for wireless terminal 201, as stored in Trait-Corrections Database 414, and
  iv. the programming model of processor 541 in subscriber identity module 504 in wireless terminal 201.

The pair-wise difference in the expected values of the electromagnetic traits of the pairs of signals that are observable in zone 230 are useful because they are immune from environmental distortions (e.g., attenuation inside an automobile, etc.) that are not indicative of location. For example, the pair-wise difference in the expected signal strength of two signals is the same at one location whether the two signals are attenuated by the skin of an automobile or not. The use of pair-wise differentials is taught in U.S. patent application Ser. No. 10/357,645, entitled "Location Estimation of Wireless Terminals Through Pattern Matching of Signal-Strength Differentials," filed Feb. 4, 2003, which is incorporated by reference. It will be clear to those skilled in the art, after reading this disclosure, how to make and use embodiments of the present invention that perform task 1101.

At task 1102, location server 214 transmits the computer-executable program to wireless terminal 201 for storage and execution in subscriber identity module 504. It will be clear to those skilled in the art, after reading this disclosure, how to make and use embodiments of the present invention that perform task 1102.

At task 1103, location server 214 determines if a change has occurred in one or more of the expected values of one or more of the traits of one or more of the signals at a location in zone 230, as stored in Location-Trait Database 413. When a change occurs, the computer-executable program transmitted to wireless terminal 201 might be basing its estimate of whether wireless terminal 201 is in zone 230 based on erroneous expectations, and, therefore, might produce erroneous estimates. In this case, control returns to task 1101 where a new computer-executable program is generated for wireless terminal 201 based on the new expected values.

Figure 12:
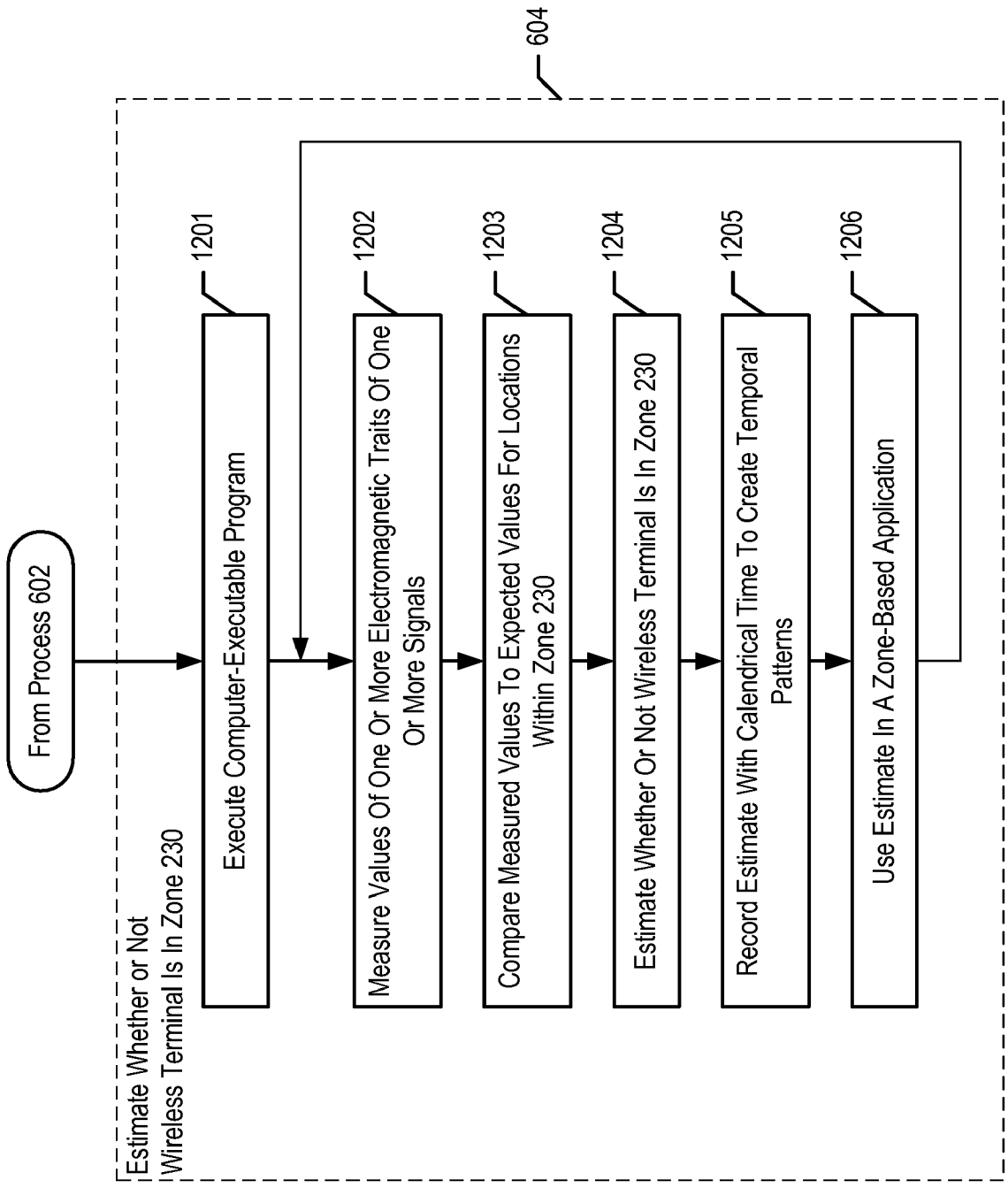
FIG. 12 depicts a flowchart of the salient tasks performed as part of task 604: estimating whether or not wireless terminal 201 is in zone 230.

Estimate Whether or Not Wireless Terminal 201 Is In Zone 230—FIG. 12 depicts a flowchart of the salient tasks performed as part of task 604: estimating whether or not wireless terminal 201 is in zone 230. In accordance with the illustrative embodiment, task 604 runs continually and concurrently with task 603.

In accordance with the illustrative embodiment of the present invention, the computer-executable program in wireless terminal 201 estimates whether or not wireless terminal 201 is in zone 203 independently and without assistance from location server 214. In some alternative embodiments of the present invention, as described in detail below and in the accompanying figures, location server 214 and the computer-executable program in wireless terminal 201 cooperate to estimate whether or not wireless terminal is in zone 230.

At task 1201, the computer-executable program received from location server 214 in task 1102 begins execution on processor 541 in subscriber identity module 504. It will be clear to those skilled in the art, after reading this disclosure, how to make and use embodiments of the present invention that accomplish task 1201.

At task 1202, the computer-executable program directs wireless terminal 201 to measure one or more values of one or more electromagnetic traits of one or more signals receivable at wireless terminal 201. The particular traits and signals measured are chosen to correspond to the expected value E(b, T, N, W, Q) for each trait, Q, for the signals expected to be observable at each location in zone 230. It will be clear to those skilled in the art, after reading this disclosure, how to make and use embodiments of the present invention that accomplish task 1202.

At task 1203, the computer-executable program compares the measured values to the expected values for each location in zone 230 and the pair-wise difference of the measured values to the pair-wise difference of the expected values for each location in zone 230. In accordance with the alternative embodiment, the comparison is performed by calculating the Euclidean distance between the measured values and the expected values for each location in zone 230 and the Euclidean distance between the pair-wise difference of the measured values and the expected values for each location in zone 230. It will be clear to those skilled in the art, after reading this disclosure, how to make and use alternative embodiments of the present invention in which the comparison is accomplished using another pattern-matching technique (e.g., a neural network, decision tree, etc.). It will be clear to those skilled in the art, after reading this disclosure, how to make and use embodiments of the present invention that accomplish task 1203.

At task 1204, the computer-executable program estimates whether or not wireless terminal is in zone 230 based on a combination of:
 i. the comparisons made in task 1203, and
 ii. the calendrical time and historical temporal patterns for wireless terminal 201 as created in previous executions of task 1205.

In accordance with the illustrative embodiment, this estimation is made by comparing the Euclidean distance between the measured values and the expected values for each location in zone 230 to a threshold. When the Euclidean distance between the measured values and the expected values for a location in zone 230 is less than the threshold—signifying that the wireless terminal is more likely to be at that location than not—then the computer-executable program estimates that wireless terminal 201 is in zone 230. In contrast, when the Euclidean distance between the measured values and the expected values for all of the location in zone 230 is greater than the threshold—signifying that the wireless terminal is more likely to be outside zone 230 than not—then the computer-executable program estimates that wireless terminal 201 is outside zone 230. In ambiguous situations—situations where the Euclidean distance is near the threshold—temporal patterns for when wireless terminal 201 is in zone 203 and when it is not (as compiled in task 1205) can disambiguate otherwise ambiguous results. It will be clear to those skilled in the art how to set the threshold to reflect an acceptable number of false-positive estimates and false-negative estimates. It will be clear to those skilled in the art, after reading this disclosure, how to make and use embodiments of the present invention that accomplish task 1204.

At task 1205, the computer-executable program records the estimate determined in task 1204 in combination with the calendrical time to create temporal patterns for when wireless terminal 201 is in zone 203 and when it is not. For example, such usage patterns might reflect a tendency for wireless terminal 201 to be in zone 230 between midnight and 7:00 AM Monday through Friday. As described above, the tendencies revealed by the temporal patterns can be used to resolve ambiguities in the results of the pattern matching in task 1204. It will be clear to those skilled in the art, after reading this disclosure, how to make and use embodiments of the present invention that accomplish task 1205.

At task 1206, the estimate of whether wireless terminal 201 is in zone 230 or not is:
 i. output from wireless terminal 201 to its user via a user interface on wireless terminal 201,
 ii. transmitted to location server 214 via telecommunications transceiver 502, and
 iii. used in a zone-base application, such as zone-based billing or zone-based advertising.

It will be clear to those skilled in the art, after reading this disclosure, how to make and use embodiments of the present invention that accomplish task 1206.

Figure 13:
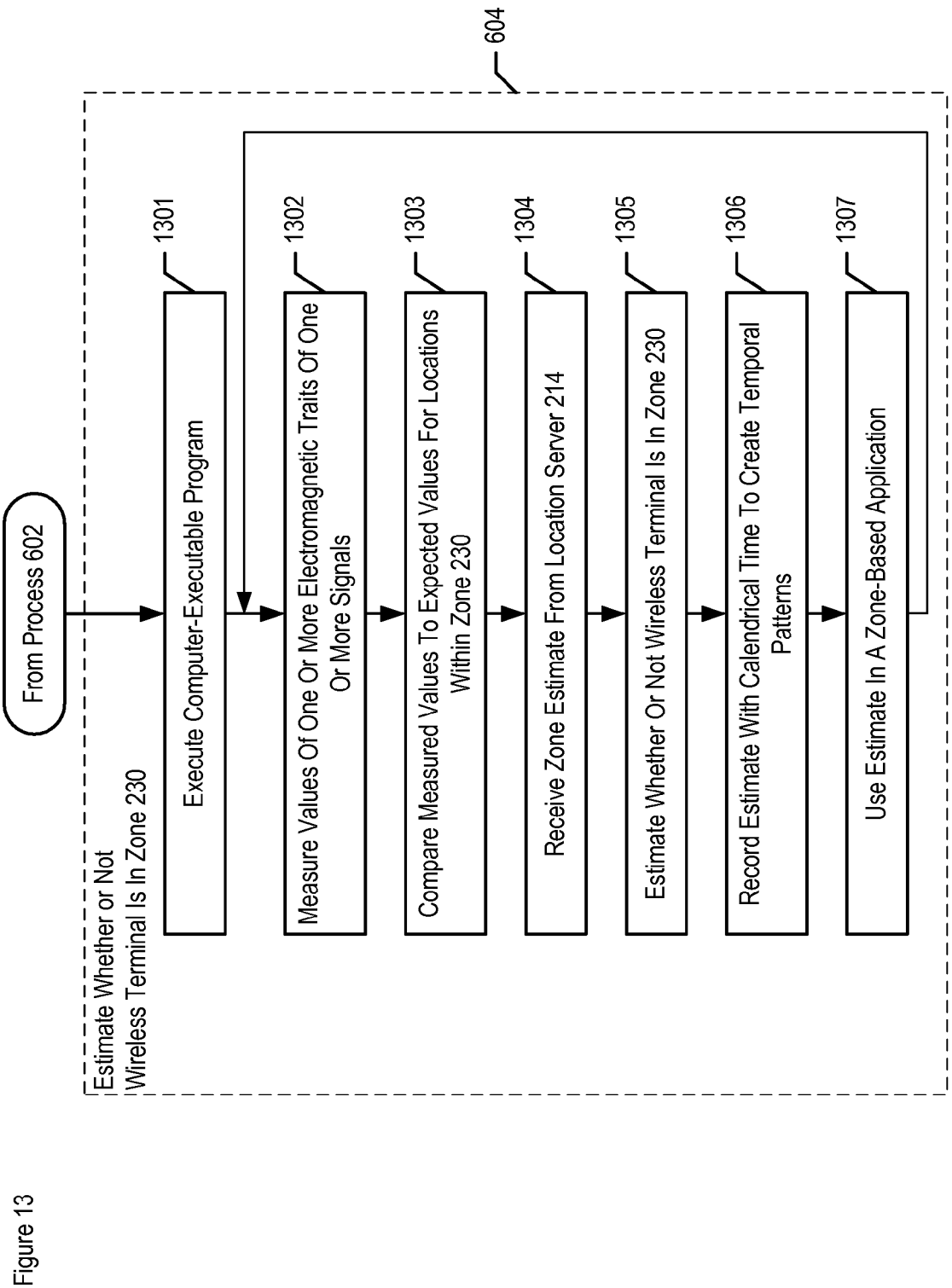
FIG. 13 depicts a flowchart of the salient tasks performed as part of an alternative embodiment of task 604: estimating whether or not wireless terminal 201 is in zone 230.

Alternative Embodiment of Estimating Whether or Not Wireless Terminal 201 Is In Zone 230—FIG. 13 depicts a flowchart of the salient tasks performed as part of an alternative embodiment of task 604: estimating whether or not wireless terminal 201 is in zone 230. In accordance with the alternative embodiment, task 604 runs continually and concurrently with task 603.

In accordance with the alternative embodiment of the present invention, the computer-executable program in wireless terminal 201 estimates whether or not wireless terminal 201 is in zone 203 with assistance from location server 214.

At task 1301, the computer-executable program received from location server 214 in task 1102 begins execution on processor 541 in subscriber identity module 504. It will be clear to those skilled in the art, after reading this disclosure, how to make and use embodiments of the present invention that accomplish task 1301.

At task 1302, the computer-executable program directs wireless terminal 201 to measure one or more values of one or more electromagnetic traits of one or more signals receivable at wireless terminal 201. The particular traits and signals measured are chosen to correspond to the expected value $E(b, T, N, W, Q)$ for each trait, Q, for the signals expected to be observable at each location in zone 230. It will be clear to those skilled in the art, after reading this disclosure, how to make and use embodiments of the present invention that accomplish task 1302.

At task 1303, the computer-executable program compares the measured values to the expected values for each location in zone 230 and the pair-wise difference of the measured values to the pair-wise difference of the expected values for each location in zone 230. In accordance with the alternative embodiment, the comparison is performed by calculating the Euclidean distance between the measured values and the expected values for each location in zone 230 and the Euclidean distance between the pair-wise difference of the measured values and the expected values for each location in zone 230. It will be clear to those skilled in the art, after reading this disclosure, how to make and use alternative embodiments of the present invention in which the comparison is accomplished using another pattern-matching technique (e.g., a neural network, decision tree, etc.). It will be clear to those skilled in the art, after reading this disclosure, how to make and use embodiments of the present invention that accomplish task 1303.

At task 1304, the computer-executable program receives an estimate of the location of wireless terminal 201 from location server 214. The procedure for making this estimate is taught in U.S. patent application Ser. No. 11/419,645, entitled "Estimating the Location of a Wireless Terminal Based on Non-Uniform Probabilities of Movement," filed 22 May 2006, which is incorporated by reference. It will be clear to those skilled in the art, after reading this disclosure, how to make and use embodiments of the present invention that accomplish task 1304.

At task 1305, the computer-executable program estimates whether or not wireless terminal is in zone 230 based on a combination of:
 i. the comparisons made in task 1303,
 ii. the calendrical time and historical temporal patterns for wireless terminal 201 as created in previous executions of task 1306, and
 iii. the estimate of the location of wireless terminal 1304, as received from location server 214 in task 1304.

It will be clear to those skilled in the art, after reading this disclosure, how to make and use embodiments of the present invention that accomplish task 1304.

At task 1306, the computer-executable program records the estimate determined in task 1304 in combination with the calendrical time to create a historical record for when wireless terminal 201 is in zone 203 and when it is not. For example, such a historical record might reflect a tendency for wireless terminal 201 to be in zone 230 between midnight and 7:00 AM Monday through Friday. As described above, the tendencies revealed by the historical record can be used to resolve ambiguities in the results of the pattern matching in task 1304. It will be clear to those skilled in the art, after reading this disclosure, how to make and use embodiments of the present invention that accomplish task 1305.

At task 1307, the estimate of whether wireless terminal 201 is in zone 230 or not is:
i. output from wireless terminal 201 to its user via a user interface on wireless terminal 201,
ii. transmitted to location server 214 via telecommunications transceiver 502, and
iii. used in a zone-base application, such as zone-based billing or zone-based advertising.

It will be clear to those skilled in the art, after reading this disclosure, how to make and use embodiments of the present invention that accomplish task 1306.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    generating a computer-executable program based on a database that comprises:
        (i) a first expected value of an electromagnetic trait of a first signal in a first location, and
        (ii) a second expected value of the electromagnetic trait of a second signal in a second location;
    transmitting the computer-executable program to a wireless terminal for execution on the wireless terminal; and
    installing the computer-executable program on a subscriber identity module on the wireless terminal;
    wherein the computer-executable program estimates whether or not the wireless terminal is present in a zone without accessing the database, and based on a measured value of the electromagnetic trait of the first signal; and
    wherein the zone comprises the first location and the second location.

2. The method of claim 1 further comprising executing the computer-executable program on the subscriber identity module of the wireless terminal.

3. The method of claim 1 wherein the computer-executable program is also based on a characteristic, C, of the wireless terminal.

4. The method of claim 1 wherein generating the computer-executable program is performed in response to a change in the second expected value of the electromagnetic trait of the second signal in the second location.

5. The method of claim 1 wherein the computer-executable program estimates whether or not the wireless terminal is present in the zone also based on the calendrical time.

6. The method of claim 1 wherein the computer-executable program estimates whether or not the wireless terminal is present in the zone also based on a historical record of the wireless terminal.

7. A method comprising:
    generating a computer-executable program based on a database that comprises:
        (i) a first expected value of an electromagnetic trait of a first signal in a location,
        (ii) a second expected value of the electromagnetic trait of a second signal in the location;
    transmitting the computer-executable program to a wireless terminal for execution on the wireless terminal; and
    installing the computer-executable program on a subscriber identity module on the wireless terminal;
    wherein the computer-executable program estimates whether or not the wireless terminal is present in a zone without accessing the database, and based on:
        (a) a measured value of the electromagnetic trait of the first signal,
        (b) a measured value of the electromagnetic trait of the second signal, and
        (c) the difference between the measured value of the electromagnetic trait of the first signal and the measured value of the electromagnetic trait of the second signal.

8. The method of claim 7 further comprising executing the computer-executable program on the subscriber identity module on the wireless terminal.

9. The method of claim 7 wherein the computer-executable program is also based on a characteristic, C, of the wireless terminal.

10. The method of claim 7 wherein generating the computer-executable program is performed in response to a change in the second expected value of the electromagnetic trait of the second signal in the location.

11. The method of claim 7 wherein the computer-executable program estimates whether or not the wireless terminal is present in the zone is also based on the calendrical time.

12. The method of claim 7 wherein the computer-executable program estimates whether or not the wireless terminal is present in the zone is also based on a historical record of the wireless terminal.

13. A location server comprising:
    a memory, which is non-volatile, for storing a database that comprises:
        (i) a first expected value of an electromagnetic trait of a first signal in a first location, and
        (ii) a second expected value of the electromagnetic trait of a second signal in a second location;
    a processor for generating a computer-executable program based on the database, wherein the computer-executable program is installable on a subscriber identity module of a wireless terminal, and wherein the computer-executable program is executable on the wireless terminal to estimate whether or not the wireless terminal is present in a zone without accessing the database, and based on a measured value of the electromagnetic trait of the first signal, and wherein the zone comprises the first location and the second location; and
    a transceiver for transmitting the computer-executable program to the wireless terminal.

14. The location server of claim 13 wherein the computer-executable program is executable on the subscriber identity module of the wireless terminal.

15. The location server of claim 13 wherein the computer-executable program is also based on a characteristic, C, of the wireless terminal.

16. The location server of claim 13 wherein the processor is further for generating the computer-executable program in response to a change in the second expected value of the electromagnetic trait of the second signal in the second location.

17. The location server of claim 13 wherein the computer-executable program is further executable to estimate whether or not the wireless terminal is present in the zone based on the calendrical time.

18. The location server of claim 13 wherein the computer-executable program is further executable to estimate whether or not the wireless terminal is present in the zone based on a historical record of the wireless terminal.

19. A location server comprising:

a memory, which is non-volatile, for storing a database that comprises:
- (i) a first expected value of an electromagnetic trait of a first signal in a location, and
- (ii) a second expected value of the electromagnetic trait of a second signal in the location;

a processor for generating a computer-executable program based on the database, wherein the computer-executable program is installable on a subscriber identity module of a wireless terminal, and wherein the computer-executable program is executable on the wireless terminal to estimate whether or not the wireless terminal is present in a zone without accessing the database, and based on:
- (a) a measured value of the electromagnetic trait of the first signal,
- (b) a measured value of the electromagnetic trait of the second signal, and
- (c) the difference between the measured value of the electromagnetic trait of the first signal and the measured value of the electromagnetic trait of the second signal; and a transceiver for transmitting the computer-executable program to the wireless terminal.

20. The location server of claim 19 wherein the computer-executable program is executable on the subscriber identity module of the wireless terminal.

21. The location server of claim 19 wherein the computer-executable program is also based on a characteristic, C, of the wireless terminal.

22. The location server of claim 19 wherein the processor is further for generating the computer-executable program in response to a change in the second expected value of the electromagnetic trait of the second signal in the second location.

23. The location server of claim 19 wherein the computer-executable program is further executable to estimate whether or not the wireless terminal is present in the zone based on the calendrical time.

24. The location server of claim 19 wherein the computer-executable program is further executable to estimate whether or not the wireless terminal is present in the zone based on a historical record of the wireless terminal.

* * * * *